(12) United States Patent
Fallah

(10) Patent No.: US 9,529,448 B2
(45) Date of Patent: Dec. 27, 2016

(54) DATA ENTRY SYSTEMS AND METHODS

(76) Inventor: Farzan Fallah, San Jose, CA (US)

(*) Notice: Subject to any disclaimer, the term of this patent is extended or adjusted under 35 U.S.C. 154(b) by 604 days.

(21) Appl. No.: 13/596,562

(22) Filed: Aug. 28, 2012

(65) Prior Publication Data

US 2013/0050096 A1 Feb. 28, 2013

Related U.S. Application Data

(60) Provisional application No. 61/529,434, filed on Aug. 31, 2011, provisional application No. 61/651,699, filed on May 25, 2012.

(51) Int. Cl.
*G06F 3/023* (2006.01)
*G06F 3/0488* (2013.01)

(52) U.S. Cl.
CPC ......... *G06F 3/0233* (2013.01); *G06F 3/04883* (2013.01); *G06F 3/04886* (2013.01)

(58) Field of Classification Search
CPC . G06F 3/0233; G06F 3/04886; G06F 3/04883
USPC ........................................ 345/173
See application file for complete search history.

(56) References Cited

U.S. PATENT DOCUMENTS

| | | | |
|---|---|---|---|
| 4,159,471 A | 6/1979 | Whitaker | |
| 4,176,974 A * | 12/1979 | Bishai et al. | 400/111 |
| 4,727,357 A * | 2/1988 | Curtin | G06F 3/0233 341/22 |
| 5,128,672 A * | 7/1992 | Kaehler | 341/23 |
| 5,303,312 A * | 4/1994 | Comerford et al. | 382/189 |
| 5,343,537 A * | 8/1994 | Bellegarda et al. | 382/186 |
| 5,521,986 A | 5/1996 | Curtin | |
| 5,588,073 A * | 12/1996 | Lee et al. | 382/187 |
| 6,121,960 A * | 9/2000 | Carroll | G06F 1/1626 345/169 |
| 6,326,947 B1 * | 12/2001 | Capps | G06F 3/0219 340/815.44 |
| 7,925,092 B2 | 4/2011 | Wang | |
| 8,830,182 B1 * | 9/2014 | Alakuijala | 345/173 |
| 2002/0145592 A1 * | 10/2002 | Schauer | G06F 3/0233 345/156 |
| 2003/0017844 A1 * | 1/2003 | Yu | 455/556 |
| 2004/0140956 A1 * | 7/2004 | Kushler et al. | 345/168 |
| 2010/0073302 A1 * | 3/2010 | Ritzau | G06F 3/0233 345/173 |

(Continued)

*Primary Examiner* — Kathy Wang-Hurst
*Assistant Examiner* — Joseph Fox
(74) *Attorney, Agent, or Firm* — Jennifer Meredith, Esq.; Meredith & Keyhani, PLLC

(57) ABSTRACT

A system for inputting data in an electronic device comprising: a segmented pattern on a touch sensitive graphical user interface; a numeric value associated to each of the segments; a set of the numeric values associated to at least one character to provide a corresponding character table stored in the electronic device; an input signal received on at least one segment to provide an input having numeric values; a sequence of at least one segment determined according to the input having numeric values and the character table; a matched character determined according to input having numeric values, the sequence and the character table; wherein the matched character is displayed on the touch sensitive graphical user interface of an electronic device, stored and the segmented pattern on the touch sensitive graphical user interface of the electronic device is reset.

4 Claims, 20 Drawing Sheets

(56) References Cited

U.S. PATENT DOCUMENTS

2010/0188338 A1* 7/2010 Longe .................. G06F 3/0238
 345/168
2011/0134068 A1* 6/2011 Shimoni ....................... 345/173

* cited by examiner

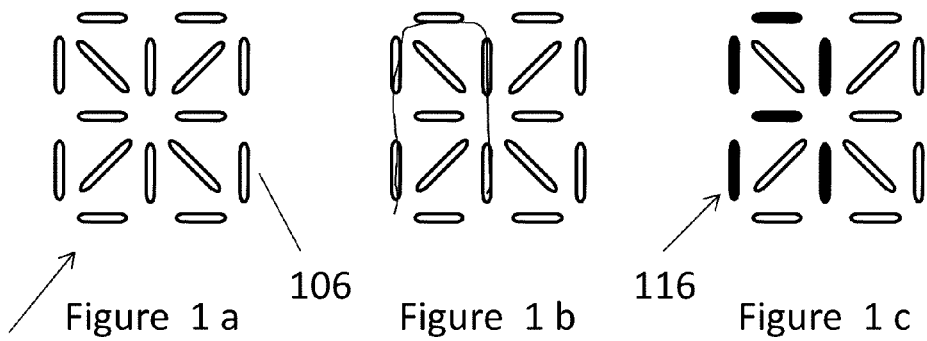
106 116
Figure 1 a  Figure 1 b  Figure 1 c
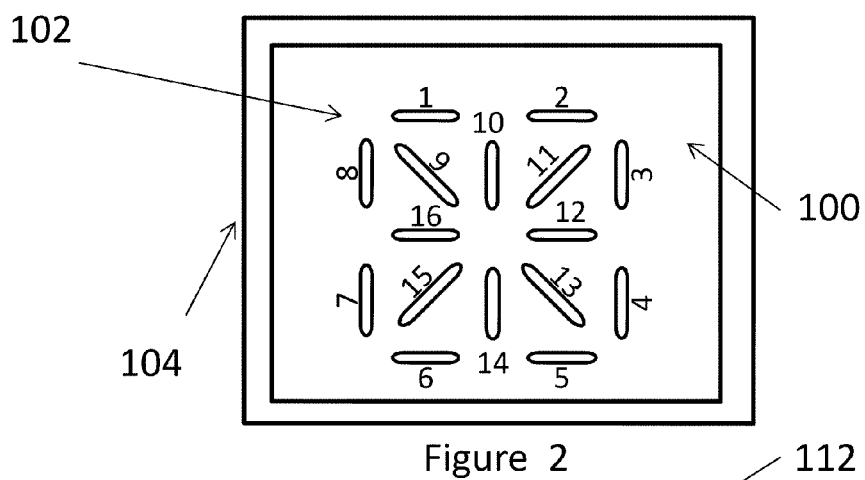
Figure 2
| Segment Numbers | Character |
|---|---|
| ⋮ | ⋮ |
| {1, 2, 3, 4, 7, 8, 12, 16} | A |
| ⋮ | ⋮ |
| {1, 7, 8, 10, 14, 16} | A |
| ⋮ | ⋮ |
| {6, 7, 16} | c |
| ⋮ | ⋮ |
Figure 3

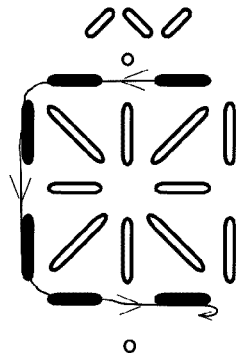 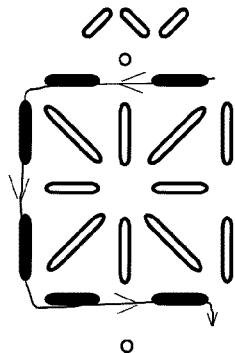 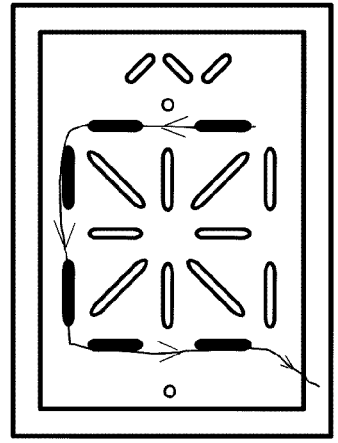
Figure 17a     Figure 17b     Figure 17c
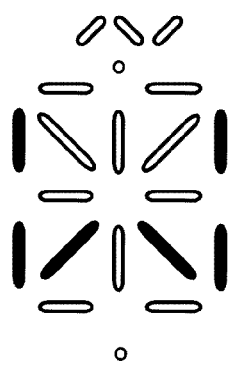 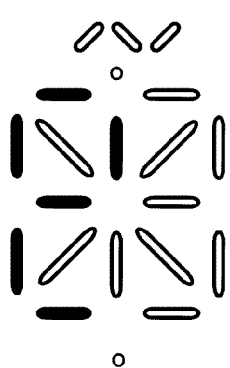
Figure 17d     Figure 17e
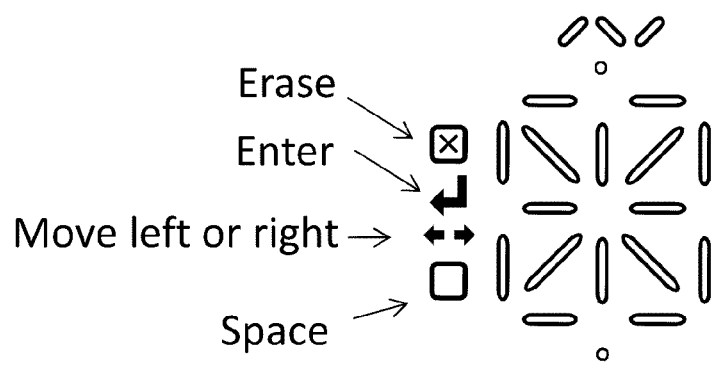
Figure 18

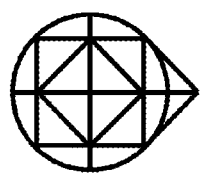
Figure 21a
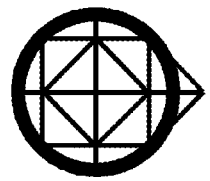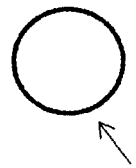
Figure 21b     The circle which can be moved.
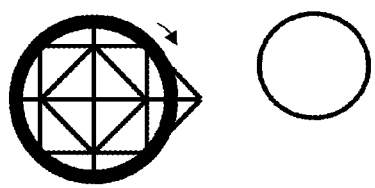
Figure 22a
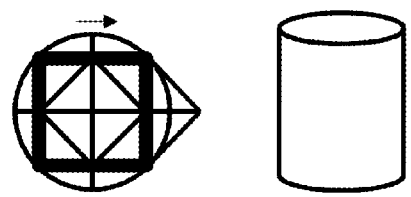
Figure 22b
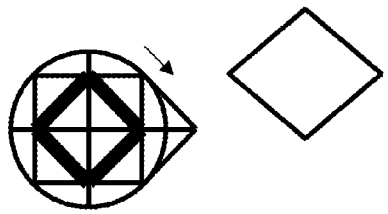
Figure 23a
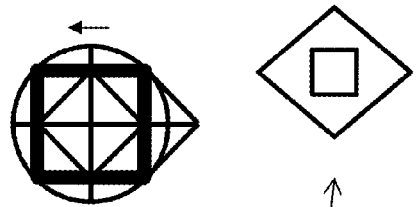
Figure 23b
200

The shape which can be moved

| Segment Numbers | Character |
|---|---|
| ⋮ | ⋮ |
| {12, 16} | - |
| ⋮ | ⋮ |
| {5, 6} | _ |
| ⋮ | ⋮ |
| {5, 6, 12, 16} | = |
| ⋮ | ⋮ |

Figure 28

| Segment Numbers |
|---|
| ⋮ |
| {12, 16} |
| ⋮ |
| {5, 6} |
| ⋮ |

Figure 29

```
list touchedStrokes;  // List of strokes written so far.
Boolean FindChar(list S) {  // S is a list of strokes.
                            // It is empty when first called.
    Boolean result;

if touchedStrokes is empty {
       if S is empty
            return true;
       else return false;
    } int st = the first element of touchedStrokes list
    Remove the first element of touchedStrokes list
    Insert st at the end of S.

if a valid character corresponding to segments in the strokes of S exists in
the character table {
         Output the character;
         list S2;
         if FindChar(S2)
            result = true;
         else {
            Delete the last outputted character;
            result = FindChar(S);
         }
    } else {
         if a valid character whose segments is a subset of the segments of the
strokes of S exists in the character table
              result = FindChar(S);
         else result = false;
    }

Insert st at the beginning of touchedStrokes list
    return result;
}
```

Figure 34

```
list touchedSegs;  // List of touched segments so far.
Boolean FindChar2(list S) {  // S is a list of segments.
                             // It is empty when first called.
  Boolean result;

if touchedSegs is empty {
    if S is empty
        return true;
    else return false;
  } int seg = the first element of touchedSegs list
  Remove the first element of touchedSegs list
  Insert seg at the end of S.

if a valid character corresponding to segments in S exists in the character table {
        Output the character;
        list S2;
        if FindChar2(S2)
           result = true;
        else {
           Delete the last outputted character;
           result = FindChar2(S);
        }
  } else {
        if a valid character whose segments is a subset of S exists in the character table
            result = FindChar2(S);
        else result = false;
  }

Insert seg at the beginning of touchedSegs list
  return result;
}
```

Figure 35

DATA ENTRY SYSTEMS AND METHODS

This application claims priority to provisional patent application No. U.S. 61/529,434 filed Aug. 31, 2011 and entitled "Hand Written data entry system" and provisional patent application NO. U.S. 61/651,699 filed May 25, 2012 and entitled "Hand Written data entry system-enhancements," the entire contents of both of which are incorporated herein by reference.

The present invention generally relates to electronic devices and in particular to operational control of such devices with a touch sensitive screen.

Finding an easier method to input characters into a digital system is a hot topic in the field of computer-human interaction. While for systems such as desktops or laptops, physical keyboards are the accepted solution, for smaller systems such as smart phones, using a large physical keyboard is not practical. Current smart phones use a small physical keyboard with small keys which are not easy to use especially for people with large fingers. Furthermore, the small number of keys in such keyboards means that some characters cannot be entered into the digital system easily. Virtual keyboards are another solution, which have become popular thanks to the progress in manufacturing touch screens, but the number of keys that can be displayed on a touch screen is limited by the small size of the smart phones' screens.

This invention describes a system/method/device for inputting characters, symbols and shapes into a digital system such as a smart phone. It uses a pattern to guide the user in writing glyphs, characters, symbols or shapes. As a result, it will be easier for the digital system to detect the handwriting.

These and other features, aspects and advantages of the present invention will become better understood with reference to the following description and claims.

SUMMARY OF THE INVENTION

The present invention generally relates to electronic devices and in particular to operational control of such devices with a touch sensitive screen.

According to one embodiment, a system for inputting data in an electronic device is provided, the system comprising: a segmented pattern on a touch sensitive graphical user interface of an electronic device, the segmented pattern having at least two segments; a numeric value in the electronic device associated to each of the at least two segments; a set of the numeric values associated to at least one character to provide a corresponding character table stored in the electronic device; an input signal received on at least one segment of the segmented pattern to provide an input having numeric values associated with each of the segments; a sequence of at least one segment determined by the electronic device according to the input having numeric values and the character table; a matched character determined by the electronic device according to input having numeric values, the sequence and the character table; wherein the matched character is displayed on the touch sensitive graphical user interface of an electronic device and stored in the electronic device and the segmented pattern on the touch sensitive graphical user interface of the electronic device is reset.

According to another embodiment, a system for inputting data in an electronic device is provided, the system comprising: a segmented pattern on a touch sensitive graphical user interface of an electronic device, the segmented pattern having at least two segments; a numeric value in the electronic device associated to each of the at least two segments; a set of the numeric values associated to at least one character to provide a corresponding character table stored in the electronic device; an input signal received on at least one segment of the segmented pattern to provide an input having numeric values associated with each of the segments; a matched character determined by the electronic device according to the input having numeric values and the character table; a keyboard in communication with the touch sensitive graphical user interface of the electronic device, wherein said keyboard accepts keyboard character input; wherein the matched character and the keyboard character input is displayed on the touch sensitive graphical user interface of an electronic device and stored in the electronic device and the segmented pattern on the touch sensitive graphical user interface of the electronic device is reset.

A system for inputting data in an electronic device, the system comprising: a multi-lingual keyboard with multiple characters written on each key in communication with the electronic device, wherein said keyboard accepts keyboard character input; at least two dictionaries, wherein each dictionary contains words of a given language; wherein based on the keyboard character input and the dictionaries, the system detects the matched language in which the user is typing and the typed word.

A system for inputting data in an electronic device, the system comprising: a segmented pattern on a touch sensitive graphical user interface of an electronic device, the segmented pattern having at least two segments; a numeric value in the electronic device associated to each of the at least two segments; a set of the numeric values associated to at least one shape to provide a corresponding shape table stored in the electronic device; an input signal received on at least one segment of the segmented pattern to provide an input having numeric values associated with each of the segments; a matched shape determined by the electronic device according to input having numeric values and the shape table; wherein the matched shape is displayed on the touch sensitive graphical user interface of an electronic device and stored in the electronic device and the segmented pattern on the touch sensitive graphical user interface of the electronic device is reset.

A system for inputting data in an electronic device, the system comprising: at least two segmented patterns on a touch sensitive graphical user interface of an electronic device, each segmented pattern having at least two segments; a numeric value in the electronic device associated to each of the at least two segments; a set of the numeric values associated to at least one character to provide a corresponding character table stored in the electronic device; an input signal received on at least one segment of the segmented pattern to provide an input having numeric values associated with each of the segments; a matched character determined by the electronic device according to the input and the corresponding character table; wherein an indicator of the input signal is displayed on segments of a second segmented pattern according to the input signal received on at least one segment of a first segmented pattern and the matched character is displayed on the touch sensitive graphical user interface of the electronic device and stored in the electronic device and the first and second segmented patterns are reset.

A system for inputting data in an electronic device, the system comprising: at least two segmented patterns displayed on a touch sensitive graphical user interface of an electronic device, each segmented pattern having at least two segments; a numeric value in the electronic device associated to each of the at least two segments; a set of the numeric values associated to at least one character to provide a corresponding character table stored in the electronic device; an input signal received on at least one segment of the segmented pattern to provide an input having numeric values associated with each of the segments; a matched character determined by the electronic device according to the input having numeric values and the corresponding character table; wherein the matched character is displayed in place of the segmented pattern displayed on a touch sensitive graphical user interface of an electronic device on which the input signal was received, stored in the electronic device and the segmented pattern on the touch sensitive graphical user interface of the electronic device is reset.

These and other features, aspects and advantages of the present invention will become better understood with reference to the following description and claims.

BRIEF DESCRIPTION OF THE DRAWINGS

FIG. 1a depicts a segmented pattern which can be used for inputting information according to the present invention;

FIG. 1b depicts a line drawn on a segmented pattern according to the present invention;

FIG. 1c depicts a character written on a segmented pattern according to the present invention;

FIG. 2 depicts numbers associated with segments according to the present invention;

FIG. 3 depicts a table with prewritten entries according to the present invention;

FIG. 17a depicts one example of an end signal written on a segmented pattern according to the present invention;

FIG. 17b depicts another example of an end signal written on a segmented pattern according to the present invention;

FIG. 17c depicts another example of an end signal written on a segmented pattern according to the present invention;

FIG. 17d depicts a character written on a segmented pattern according to the present invention;

FIG. 17e depicts a character written on a segmented pattern according to the present invention;

FIG. 18 depicts special purpose buttons and a segmented pattern according to the present invention;

FIG. 21a depicts a segmented pattern which can be used for inputting information according to the present invention;

FIG. 21b depicts a segmented pattern which has been used for inputting a circle according to the present invention;

FIG. 22a depicts a segmented pattern which has been used for inputting a circle according to the present invention;

FIG. 22b depicts a segmented pattern which has been used for inputting a square according to the present invention;

FIG. 23a depicts a segmented pattern which has been used for inputting a rhombus according to the present invention;

FIG. 23b depicts a segmented pattern which has been used for inputting a square according to the present invention;

FIG. 28 depicts a character table;

FIG. 29 depicts an exception list;

FIG. 34 depicts an algorithm for processing strokes written in pseudocode;

FIG. 35 depicts an algorithm for processing segments written in pseudocode;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a method for inputting data in an electronic device. The electronic device may be, for example, a variety of computing devices capable of presenting data and communicating with a touch screen interface or a touch pad interface. Examples of computing devices include, but are not limited to smart phones, personal data assistants (PDAs), laptops, mobile phones, portable multi media devices, Iphone®, Ipad®, surface computing devices and the like.

The present invention provides a system for inputting data in an electronic device. As would be appreciated by those of skill in the art, the system may be software performed by a processor of the electronic device. Each step of the present invention that requires steps to be performed would be performed by the processor of the electronic device. The system provides a segmented pattern (102) on a touch sensitive graphical user interface (100) of an electronic device (104), the segmented pattern (102) having at least two segments. The segments may be, by way of example, dots, straight lines or curved lines. A numeric value (e.g. 1, 2, 3, 4, 5, 6, 7, 8, 9, 10, 11, 12, 13, 14, 15, 16) in the electronic device (104) is associated to each of the at least two segments (by way of example 106 in FIG. 1a is one segment). FIGS. 1a, 1b and 1c depict a segmented pattern having sixteen segments, two segments on four sides forming an outside rectangle and eight segments extending substantially from the center of the outside rectangle to a point between each of the two segments on four sides forming an outside rectangle. In one embodiment, one or more segments are not lines. In one embodiment, one or more segments are dots or closed circles instead of lines. In one embodiment, the segments do not touch each other. In one embodiment, two or more segments touch each other.

Figure 37:
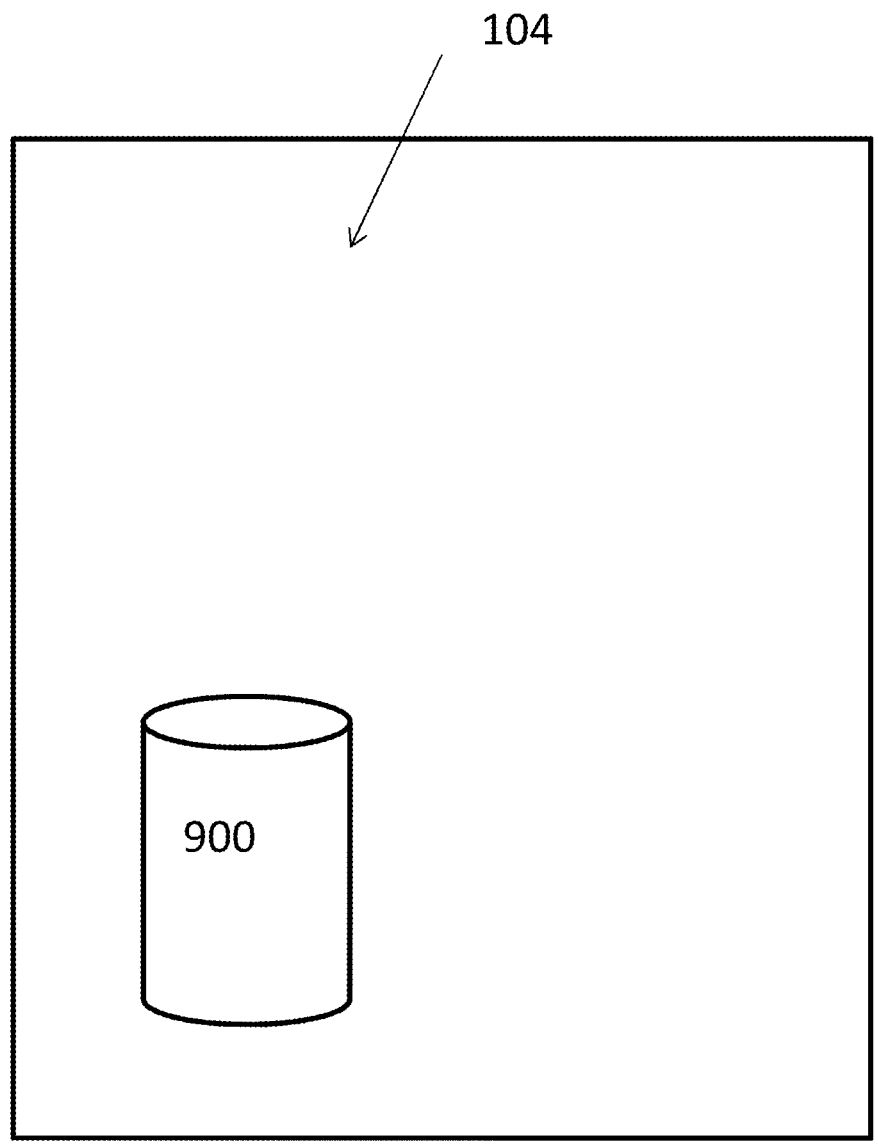
FIG. 37 depicts a computing device according to the present invention.

A set of the numeric values are associated to at least one character (110) to provide a corresponding character table (112) stored in the electronic device (104). FIG. 37 depicts an computing device/electronic device (104) with storage (900). An input signal (e.g. 114 of FIG. 13a) (which may by touch input, stylus touch input, video input or any other input means) may be received on at least one segment of the segmented pattern to provide an input having numeric values associated with each of the segments. A sequence of at least one segment (e.g. 108) is determined by the electronic device according to the input having numeric values and the character table. A sequence of at least one segment may also be a single segment. The sequence of the input signals received on at least two segments may end at a point the user has lifted his finger/ stylus (i.e. input signals are no longer being received), unless the sequence of inputs received is in an exception list. A matched character is determined by the electronic device according to the input having numeric values, the sequence and the character table, wherein the matched character is displayed on the touch sensitive graphical user interface of an electronic device, stored in the electronic device and the segmented pattern on the touch sensitive graphical user interface of the electronic device is reset. The term "character" can include, by way of example and without limitation, letters, glyphs, numbers, symbols and shapes. In the absence of a matched character, a matched character may be determined by the electronic device according to the input having numeric values, the sequence and the closest character in the character table. The term "closest character" would be the character that has the closest match to the input having numeric values and the sequence. So, for example, if the input having numeric values (or segment numbers) is (1, 3, 4, 7, 8, 11, 12 and 16) typed (or input) in the sequence (7, 8, 1, 11, 4, 16 and 12) and we know that an "A" is typically (1, 2, 3, 4, 7, 8, 12 and 16) and a "c" is typically (6, 7, and 16), the closest character is an A, even though it is not a direct match. Accordingly, the matched character is provided as the closest character in the character table. The sequence of the input signals received on the at least two segments may be the shortest possible sequence. The electronic device may backtrack and change the sequence chosen from input signals received at least one segment based on the results of matched characters (or unmatched characters) determined according to the input having numeric values and the character table.

FIG. 1c depicts an indicator (116) of the input signal. In this example, the indicator is a darker color on the segmented pattern as in an indicator of the input signal displaying activated segments according to the input signal received on at least one segment.

FIG. 1a shows a segmented pattern which can be used for receiving an input signal on at least one segment of the segmented pattern to provide an input having numeric values associated with each of the segments (inputting characters) such as English characters. The user writes with his finger or stylus on the graphical user interface (touch screen) and touches the segments of the pattern displayed on the touch screen (receiving an input signal on at least one segment of the segmented pattern to provide an input having numeric values associated with each of the segments). After touching each segment (i.e., selecting the segment or receiving an input signal on at least one segment of the segmented pattern to provide an input having numeric values associated with each of the segments;), the color of the segment may be changed. It may be a different color or merely bolded, providing an indicator of the input signal. By touching the appropriate segments, the user can write a character such as "A". FIG. 1b shows character "A" written on the pattern. In FIG. 1c, the hand drawn character has been converted into a character written using segments. Alternatively, instead of showing a line drawn by the user, segments may be selected or activated (i.e., their color changed) when the user touches them (i.e., FIG. 1c is directly generated).

There is the step of associating a numeric value in the electronic device to each of the at least two segments. FIG. 2 shows a number, or numeric value, associated with each of the sixteen segments. Thus, there will be a set of numbers (e.g. 108) corresponding with the segments that have received an input control (e.g. have been touched). After touching a set of segments, the user may signal to the electronic device (more specifically the processor of the electronic device) that he has finished entering the character/symbol (the way the user can signal will be discussed later) or the system/method/device, based on some information, decides writing the character is finished.

Figure 4:
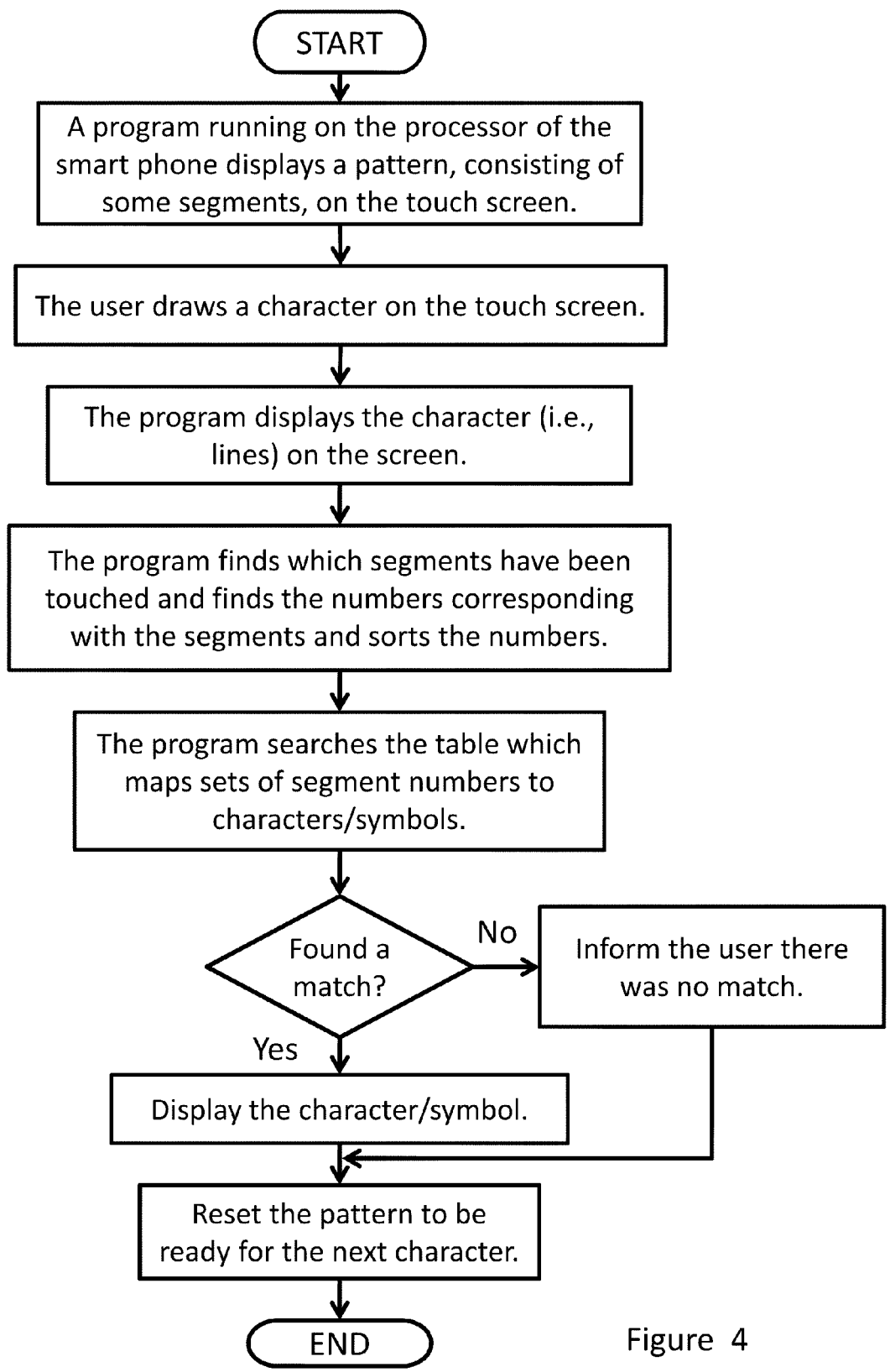
FIG. 4 depicts a flowchart according to the present invention.

The electronic device (more specifically the processor of the electronic device) sorts the numbers, which are associated with the selected segments. There is a corresponding character table with prewritten entries. Each table entry includes a set of numbers and the code (e.g., ASCII code) for the corresponding character/symbol as depicted in FIG. 3. As shown in FIG. 3, the letter A may receive input signals on segments (as shown in FIG. 2) having numeric values of (1,2,3,4,7,8,12,16) or (1,7,8,10,14,16). The electronic device would determine that A is the matched character according to the input on the segments (1,7,8,10,14,16) and the table indicating that the presence of those number indicates a matched character. The letter c may be determined as a matched character according to the input on segments (6,7, 16) and the table indicating that the presence of those number indicates a matched character. The processor searches the table to see if the set of numbers exist in the table. If the set exists, then the matched character (the term character includes symbols, etc.) is displayed on the screen; otherwise, there is no character corresponding with the set of segments touched. The processor can inform the user by displaying an error message or symbol, beeping, etc. Next, the segmented pattern is reset and the processor gets ready to receive the next character (FIG. 4). In one embodiment, the processor searches the table for a match without sorting the numbers.

Some advantages of the proposed invention are that it can easily support many languages, arithmetic symbols, numbers, and even geometric shapes, it does not require a complex algorithm with long execution time to detect the entered characters, symbols, numbers or shapes, thus, the detection (recognition) can be done in real time and without significant latency. The short execution time of the present invention translates into lower energy consumption for the processor running the method, which is very important in portable devices. The present invention can support many more characters than a typical virtual keyboard does, while using a smaller portion of the touch screen. Generally characters and symbols are required to be written the way they look, thus, memorizing a new alphabet/character set is not necessary. Because of the simplicity and its nature, its error rate is zero, if the user has touched the right segments. Thus, there will be no error when entering characters/symbols if the user's error rate is zero.

Figure 5:
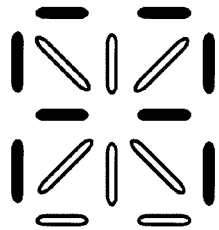
FIG. 5 depicts a character written on a segmented pattern according to the present invention.
Figures 6A, 6B:
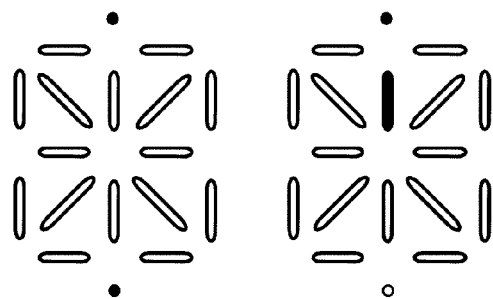
FIG. 6a depicts ":" written on a segmented pattern according to the present invention.
FIG. 6b depicts character "i" written on a segmented pattern according to the present invention.

There might be more than one set of numeric values (for segments) associated with each character. For example, FIGS. 1*c* and 5 show two ways that character "A" can be written. It is possible to use a different number of segments or different shapes for segments in the pattern. In particular, extra segments may be added to support additional symbols, other languages, etc. FIG. 6*a* shows an extended version of the pattern on which ":" has been written, while FIG. 6*b* shows the pattern on which "i" has been written. FIGS. 30-33 show how uppercase and lowercase English characters, numbers and some symbols can be written on the segmented pattern.

Figure 7:
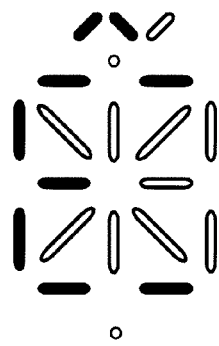
FIG. 7 depicts a character written on a segmented pattern according to the present invention.
Figure 8:
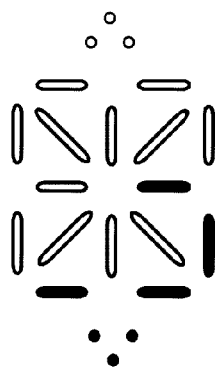
FIG. 8 depicts a character written on a segmented pattern according to the present invention.
Figure 9:
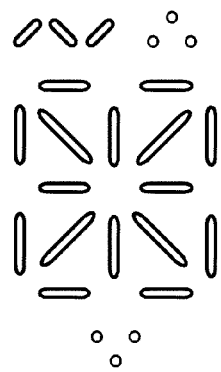
FIG. 9 depicts a segmented pattern according to the present invention.
Figure 10:
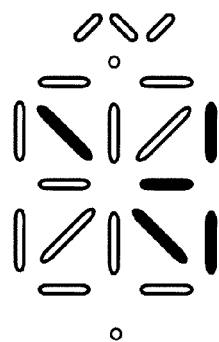
FIG. 10 depicts "for all" operator written on a segmented pattern according to the present invention.
Figure 11:
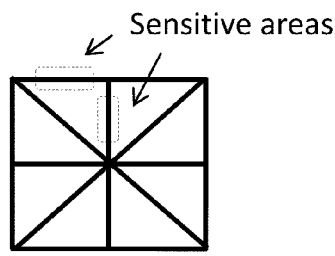
FIG. 11 depicts an alternative segmented pattern according to the present invention.
Figure 12:
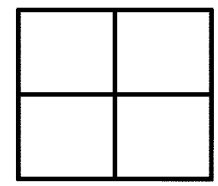
FIG. 12 depicts an alternative segmented pattern according to the present invention.

FIG. 7 shows another version, which can handle diacritics common in languages such as French. In the figure, character "Ê" has been written on the pattern. FIG. 8 shows yet another version appropriate for Farsi and Arabic languages. It is noteworthy that the above patterns can be combined to create a segmented pattern which can be used for several languages (see FIG. 9). Arithmetic symbols can be easily written using the described invention. FIG. 10 shows symbol for "for all" operator. While in the previous patterns, the segments do not touch each other, it is possible to have a pattern in which the segments touch each other. This can make the pattern look better and simpler (FIG. 11). In this case, the sensitive area of each segment can be smaller than its visible part. Thus, a segment can be selected if its sensitive area is touched. Furthermore, to reduce the chance of accidentally touching/selecting/receiving an input signal for a segment, the processor may assume the user has selected the segment if the user touches the segment for longer than a predefined threshold. In one embodiment, the threshold can be changed by the user or dynamically by the system/method/device based on the user's behavior. In one embodiment, some parts of a pattern are drawn, while other parts are not displayed to prevent cluttering the pattern (FIG. 12). FIG. 12 depicts a segmented pattern having twelve segments, two segments on each of four sides forming an outside rectangle and four segments extending from the center of the outside rectangle to the outside rectangle.

Figure 13A:
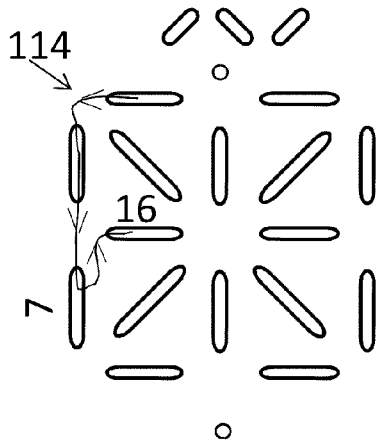
FIG. 13a depicts a character written on a segmented pattern according to the present invention.
Figure 13B:
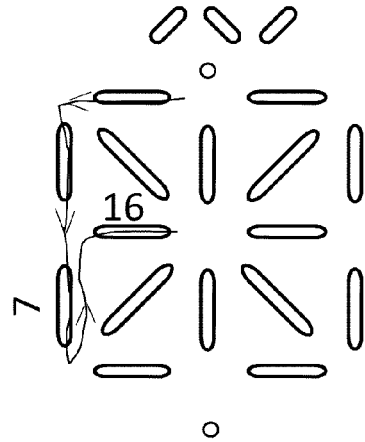
FIG. 13b depicts a character written on a segmented pattern according to the present invention.

In one embodiment, the user draws a line on the screen and the line is displayed and is later processed by the processor and the segments touching the lines or the segments close to the lines are selected. In one embodiment, the user touches the screen and the touch points are displayed and are later processed by the processor and the segments touched or close to the touched points are selected. In one embodiment, instead of displaying a line, the color and/or the style of one or more segments are changed. This provides an instant feedback to the user on what segments the processor considers to be selected. In addition to increasing the usability, this also helps the user to increase the speed of entering characters. For example, to write character "F", the user can move his finger as shown in FIG. 13*a*. Because of the instant feedback, the user sees that the processor considers segments 7 and 16 selected, therefore, the user does not need to move his/her finger further on segments 7 and 16 as shown in FIG. 13*b*.

Figure 14:
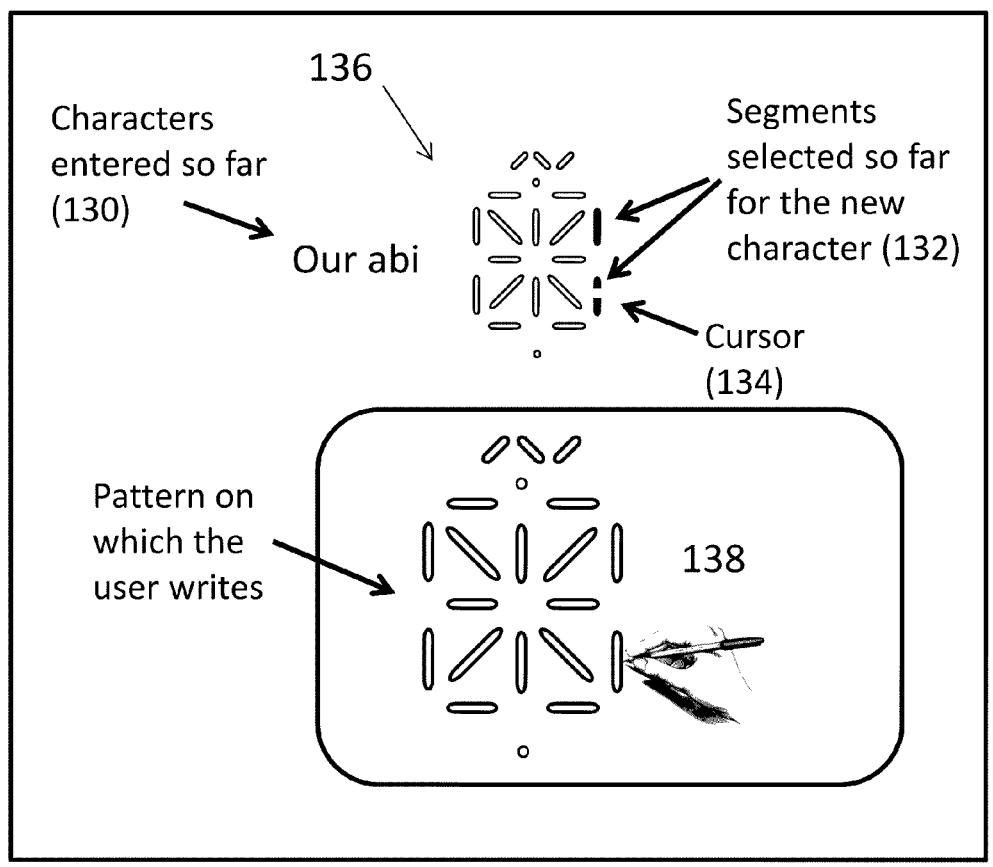
FIG. 14 depicts two segmented patterns according to the present invention, one segmented pattern for the user to draw the character and the other segmented pattern to display the selected segments to the user.

Since the user's finger or stylus may partially block the view of the pattern, in one embodiment, two segmented patterns are displayed (FIG. 14). As shown in FIG. 14, there may be a second segmented pattern (136) on a touch sensitive graphical user interface of an electronic device, wherein an indicator (132 and 134) of the input signal is displayed on activated segments of the second segmented pattern (136) according to the input signal received on at least one segment of the segmented pattern (138). There may be the steps of presenting a second segmented pattern on a touch sensitive graphical user interface of an electronic device; and displaying activated segments according to the input signal received on at least one segment. One segmented pattern is touched by the user and is used to draw the character and a second segmented pattern provides a clear view of the selected segments to the user. Selected segments correspond to input signals on at least one segment. A cursor on the second pattern displays the current position of the finger/stylus. In one embodiment, the second pattern is displayed close to the previous characters/symbols entered, thus, the user can easily see what he/she has written before.

In one embodiment, there is only one segmented pattern and the segmented pattern is used to show the user what segments have been selected. The user does not touch the segmented pattern. He/she writes on the touch screen and from the location of the cursor on the segmented pattern decides how to move his/her finger or stylus.

Figures 15A, 15B, 15C:
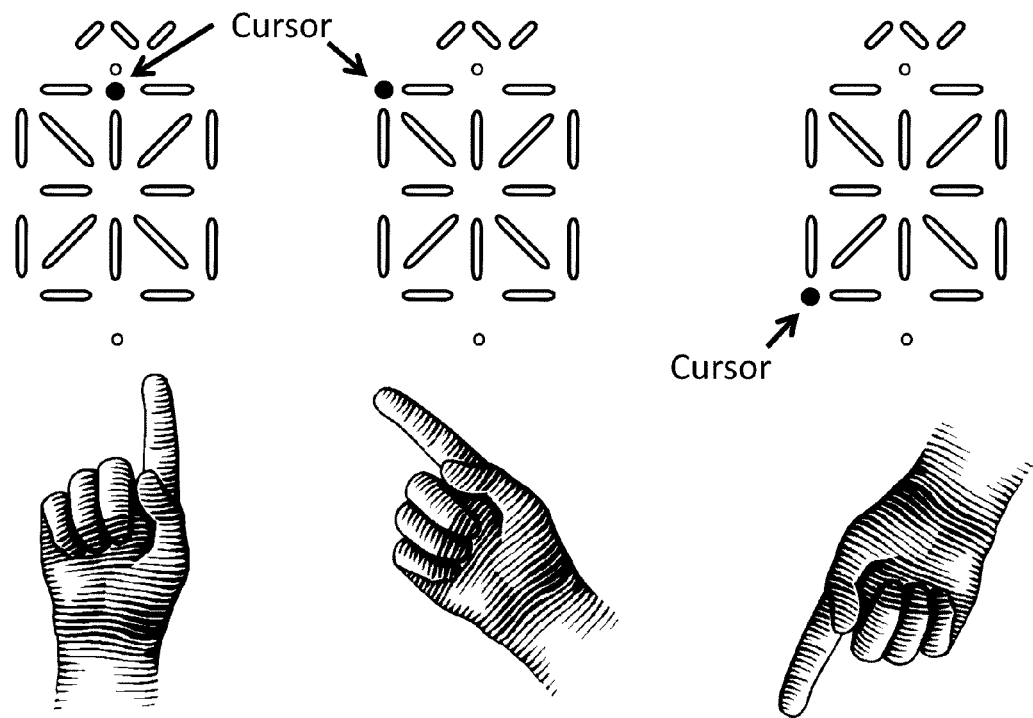
FIG. 15a depicts a segmented pattern to be used with a camera for inputting information according to the present invention.
FIG. 15b depicts a segmented pattern to be used with a camera for inputting information according to the present invention.
FIG. 15c depicts a segmented pattern to be used with a camera or inputting information according to the present invention.

The input signal may be input by touch contact, stylus device contact and video input. In one embodiment, a camera is used to capture the video/image of the movement of the user's finger or the movement of a stylus or a pen and the movement is shown on a pattern. A cursor on the pattern will show the position of the finger. Moving the finger around will put the cursor on different parts of the pattern (FIG. 15). Pointing the finger at the camera and then moving the finger will be equivalent to moving finger on a touch screen and results in selecting segments.

In one embodiment, the segments of the pattern are added or deleted dynamically as the user touches other segments. For example, if the user enters character "E", segments for accents might appear at the top of the segmented pattern in case the user wants to select them and write "Ê". This can be especially good when inputting Chinese or Japanese Kanji characters which can be very complex and require patterns with many segments. In some languages, such as Japanese, there are rules for the order of writing strokes. A stroke is the sequence of all segments touched by the user starting when the user touches the screen and ending when he lifts his finger. It is possible to write "A" without lifting finger from the screen when writing. Alternatively, "A" may be written using two strokes: one for the horizontal line and the other for the rest of the character. In the context of this invention, a user can write characters without even lifting his finger after writing each character. The present invention, using an algorithm, can break the long sequence of segments into subsequences and convert each subsequence into a character. Alternatively, a user can lift his finger after writing each character or even can write a character with more than one stroke. This obviously eases the processing of the touched segments to recognize characters. This case is also handled in this invention. In one embodiment, based on the strokes drawn by the user, some segments are added or omitted. The electronic device may backtrack and change the sequence of strokes based on the results of the matched characters or unmatched characters. A stroke may end when a user lifts their finger. In one embodiment, if the system/method/device has predicted which character the user is going to input (or enter), the predicted character is shown on the same pattern using a different color, style, etc. The predicted character is according to the input and the corresponding character table. For example, if the system knows that the letter "A" is associated with the set of numeric values 1, 2, 3, 4, 7, 8, 12, 16 and an input signal is received on line segments 1, 2, 3, 4, 7 and 8 (but not yet segments 12 and 16) it is able to predict that the character "A" is being input and displays the character "A" on a segmented pattern.

Figures 16A, 16B:
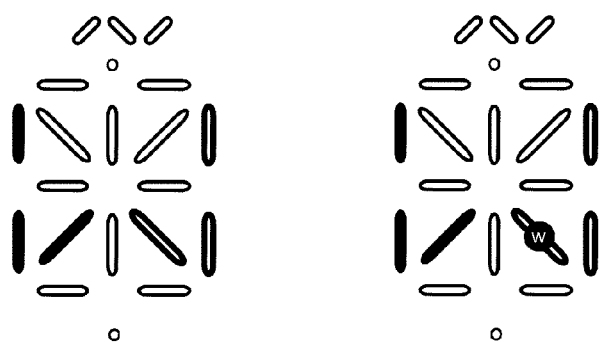
FIG. 16a depicts a portion of a character written on a segmented pattern and a predicted portion of a character written on a segmented pattern according to the present invention.
FIG. 16b depicts a portion of a character written on a segmented pattern, a predicted portion of a character written on a segmented pattern, and the predicted character displayed according to the present invention.

In FIG. 16*a*, the user has entered (or the processor has received input signals for) three segments and the system/method/device has predicted that the user wants to enter "W", so the shape of three other segments corresponding to "W" has been changed. If the character is what the user has in mind, the user accepts it by, for example, pressing a button, pressing the middle of the segment predicted by the system/method/device to be touched next, or any other ways. In one embodiment, the predicted character is displayed close to the pattern. In one embodiment, the predicted character is displayed on the next segment the user is going to touch. In one embodiment, the user can accept the predicted character by touching the character displayed on the segment (FIG. 16*b*).

In order for the system/method/device to start processing touched segments, the user may signal that he has finished entering the character. Having an easy way for this is important because it impacts the speed of entering characters. The input may be further comprised of an end signal. FIGS. 17*a*, 17*b* and 17*c* depict examples of end signals. In one embodiment, the end is signaled by the user moving his finger/stylus in the reverse direction for a short period of time or a short distance (FIG. 17*a*). In one embodiment, the end is signaled by the user moving his finger/stylus in the direction perpendicular to his last move and for a short period of time or a short distance (FIG. 17*b*). In one embodiment, the user signals the end by touching an outside border or region (FIG. 17*c*). In one embodiment, the user signals the end of character by holding his/her finger on the screen for longer than a threshold value. In one embodiment, there are several patterns for entering characters and the user signals the end of inputting a character on a pattern by starting to write on another pattern, except for the case in which it is the last character. In the case of the last character, the user signals the end of inputting a character on a pattern according to one of the other described techniques. In one embodiment, the user signals the end by removing his finger/stylus from the screen for a period of time longer than a threshold. In one embodiment, the user signals the end by tapping on the touch screen. In one embodiment, the user signals the end by double tapping on the touch screen. In one embodiment, the user signals the end by touching the middle of the last segment which was touched. In one embodiment, for some characters, the end of writing is determined when there is no segment left which can be touched to create a valid character. In one embodiment, the user continuously writes on the pattern, while lifting his/her finger from the screen/touch pad to signal the end of each stroke. The system/method/device converts the inputs into strokes and combines the strokes to make characters. In FIGS. 17*d* and 17*e*, the user has entered two strokes. There is no character corresponding with the combination of the two strokes, but the first stroke corresponds to character "W" and the second stroke corresponds to character "e". Thus, the two strokes must belong to different characters.

If there is ambiguity (i.e., there is more than one way of combining strokes to get valid characters/symbols), the system/method/device uses a dictionary to resolve the ambiguity (i.e., combines the strokes in such a way that the resulting characters build a valid word) or it uses the statistical information to pick the character/symbol with the highest occurrence frequency or it uses statistical information to pick the word with the highest occurrence frequency from the possible valid words which can be made from the written strokes and resolves the ambiguity. In this way, the step of predicting a character according to the input and the corresponding character table would include using a dictionary. In one embodiment, if a sequence of strokes cannot be processed into one or more characters, the system/method/device changes an earlier decision that was made to resolve an earlier ambiguity and reprocesses the strokes from that point. FIG. 34 shows the algorithm written in pseudocode. In the algorithm, after checking the character table to see if the set of segments correspond to a valid character, it is possible to check whether the valid character and previously detected characters correspond to a valid word in the dictionary; if both conditions hold, then the character can be written at the output. As an example of using a dictionary, consider the following strokes written by a user: {16,7,6}, {10, 14}, and {14,12,4,5}. Considering each stroke separately results in the following characters "c", "l", "o". Combining the first and the second strokes results in the following characters, "d", "o". Combining the second and the third strokes results in the following characters, "c", "b". Combining all three strokes does not result in a valid character. From the all possibilities, only the second one, i.e., combining the first and the second strokes results in a valid word (i.e., "do"), which exists in the dictionary. Thus, the sequence of strokes corresponds to word "do".

In one embodiment, different strokes may be displayed using different colors/styles of lines. Different strokes may be displayed using different colors/styles for selected segments. If a segment is selected in more than one stroke, different colors/styles may be combined. If a stroke has been processed and the character the stoke belongs to has been recognized by the system/method/device, the corresponding segments are erased. If a segment is selected in more than one stroke and later one or more of those strokes are processed and their corresponding characters are displayed, the colors/styles of the remaining strokes, which have not been processed yet, are combined.

Figure 36:
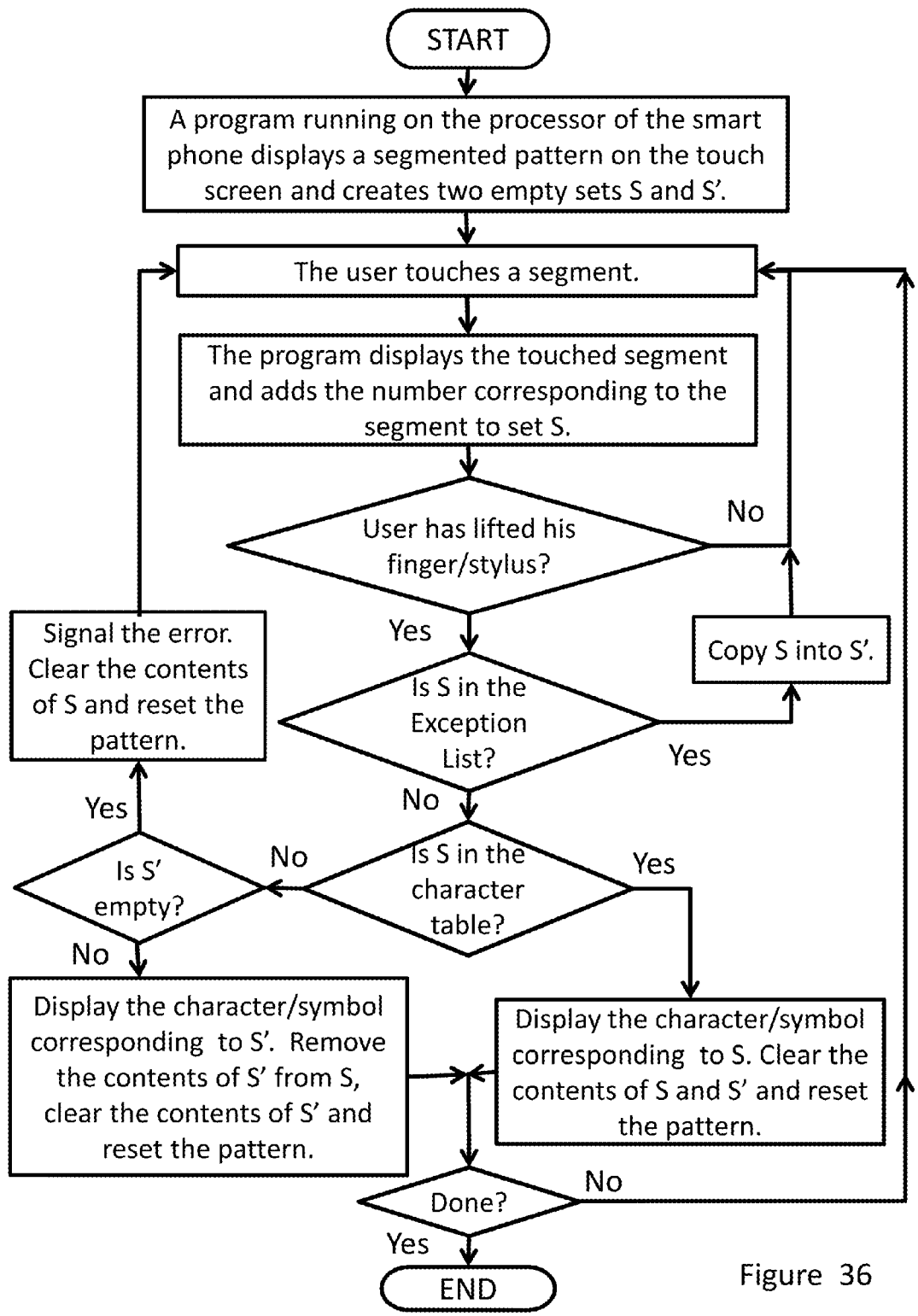
FIG. 36 depicts a flowchart according to the present invention.

In one embodiment, lifting the user's finger signals the end of the character. In one embodiment, lifting the user's finger signals the end of the character unless the set of touched segments are in a list of sets (Exception List) which will be treated differently. In one embodiment, if the set of touched segments is in the Exception List, the system/method/device waits for the user to touch the next segment before processing the touched segments (FIG. 36). The Exception List can be used for the characters and symbols which cannot be written with a single stroke. FIG. 28 shows the definitions of "–", "_" and "=". Without having an Exception List, a user will not be able to write "=" because the system/method/device will process the touched segments when the user lifts his/her finger. FIG. 29 shows an example of the Exception List. Since both {5, 6} and {12, 16} are in the Exception List, when the user touches for example segments 5 and 6 and lifts his/her finger, the system/method/device waits for the next segment to be touched before deciding whether the entered character is "_" or "=". In one embodiment, if the set of touched segments is in the Exception List, the system/method/device waits for a predefined time to see what other segment or segments the user touches if any, before processing the already touched segments. In one embodiment, if the set of touched segments is in the Exception List, the system/method/device waits for the user to press a special button (e.g., DONE button) before processing the touched segments. The exception list may be a part of the character table. In one embodiment, if there is no character corresponding to the touched segments, one or more segments of the pattern are reset. In one embodiment, if there is no character corresponding to the touched segments, the segmented pattern is not reset.

In one embodiment, the user does not need to signal the end of character if the character has more than two segments (characters are defined such that there won't be any ambiguity in constructing characters from strokes unless there is a character with one or two segments). If the character has only one or two segments, the user must wait longer than a threshold value before entering the character. In one embodiment, after entering a character which has one or two segments, the user must wait longer than a threshold value before entering the next character.

In one embodiment, the system/method/device does not take into account the order of touching segments when it tries to recognize the character. In one embodiment, the system/method/device takes into account the order of touching segments when it tries to recognize the character. Accordingly, the corresponding character table having numeric values may be order sensitive or not be order sensitive.

In one embodiment, the user can select a segment by touching it only if a particular segment or some particular segments have been touched before. In one embodiment, the user can select a segment by touching it only if a particular segment or some particular segments are touched before. In one embodiment, the user can select a segment by touching it only if a particular segment or some particular segments have been touched after it. In one embodiment, the user can select a segment by touching it only if a particular segment or some particular segments are touched after it. In one embodiment, touching an already selected segment, deselect the segment.

In one embodiment, the numbers (or characters) must be written at a particular region (e.g., right) of the pattern. In one embodiment, the numbers (or characters) must be written at left. In one embodiment, lower case characters must be written at a particular region of the pattern (e.g., lower portion of the pattern) when possible. In one embodiment, consecutive characters must be written at different regions of the pattern (e.g., first character at left and second character at right) whenever possible.

In one embodiment, only the uppercase letters are accepted. This can simplify end of character detection and the character detection itself. In one embodiment, only the lowercase letters are accepted. This can simplify end of character detection and the character detection itself.

In one embodiment, the segmented pattern is located on a touch screen or a touch pad at the back or the front of the device. In one embodiment, the segmented pattern is located on the back of a see-through touch screen.

In one embodiment, the user does not signal the end of the character; the user continuously writes on the pattern and may not lift his/her finger from the touch screen or touch pad to signal the end of each stroke. The system/method/device converts the inputs (i.e., the sequence of touched segments) into characters based on the table of characters (i.e., the table which maps sets of segments to characters) and a dictionary, which provides information about words (i.e., valid sequence of characters) (FIG. 35). As an example, consider the following sequence of segments written by a user: {7, 16, 14, 6, 7, 16}. There are several ways to break this sequence into subsequences in a way that each subsequence corresponds to a valid character, 1—{7, 16}, {14, 6, 7, 16} corresponding to characters "r" and "o", 2—{7, 16, 14}, {6, 7, 16} corresponding to characters "n" and "c", 3—{7, 16, 14, 6}, {7, 16} corresponding to characters "o" and "r". Using a dictionary, it becomes clear that only the last way of breaking the sequence into subsequences results in a valid English word, thus, the sequence is broken into {7, 16, 14, 6} and {7, 16} and characters "o" and "r" are written at the output.

In one embodiment, special purpose buttons are added to the segmented pattern. In FIG. 18, five special purpose buttons are added to the pattern for erasing what has been written on the segmented pattern (i.e., resetting the segmented pattern), for enter key, for move left, for move right, and for inserting space. In one embodiment, special purpose buttons for different languages are added so the user can choose the language he/she wants to use. In one embodiment, more than one segmented pattern is used, each for a specific language. In this case, the user does not need to press a special purpose button to change the language; he/she just starts writing on a segmented pattern corresponding to a different language.

In one embodiment, the segmented pattern(s) is (are) displayed where the entered character must be displayed.

Figure 19:
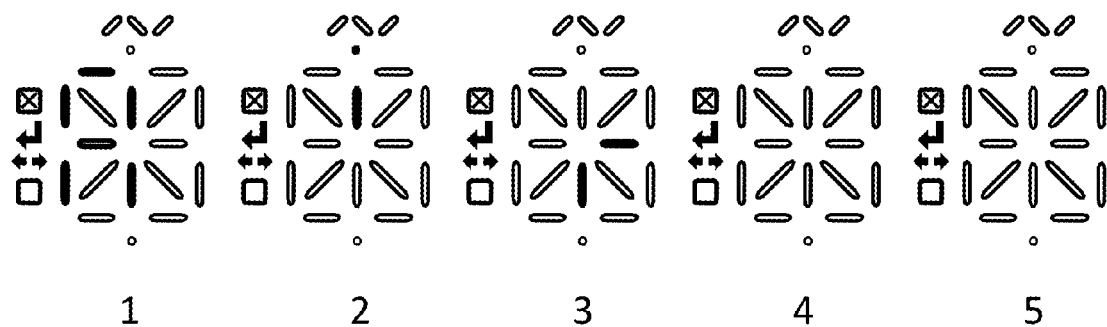
FIG. 19 depicts previously matched characters on a segmented pattern while receiving an input for a new character or predicting a character or word.

Thus, the user will see the previous entered characters while entering a new character (FIG. 19).

In one embodiment, the system/method/device guesses what word the user wants to write and displays it on the screen. The user can accept the word by skipping the displayed word and continuing to enter the characters after the displayed word. The user can accept several of characters by writing a character immediately after the displayed characters. In FIG. 19, the user is writing "A" on pattern 1. The user has not entered the last segment yet. The system/method/device predicts that the user wants to write the word "Air" and displays "A", "i" and "r" on patterns 1, 2 and 3, respectively. If the prediction is correct, the user can accept it by continuing the writing on pattern 5 to enter the next character. If the prediction is not correct, the user can erase the predicted characters (i.e., "i" and "r"), by erasing pattern 2 and writing on it (in one embodiment, just touching a segment of pattern 2 resets pattern 2 and pattern 3, thus, there will be no need to press the erase button before writing). If the second predicted character (i.e., "i") is correct, but the third predicted character (i.e., "r") is not correct, the user can erase the third character and continue by writing on pattern 3. It is noteworthy that previously entered characters, the character currently being entered and the predicted characters are all displayed close to each other, thus, there is no need for the user to constantly move his/her gaze from one point on the screen to another. This is in contrast to some virtual keyboard with word prediction used on smart phones, which require the user to move his/her gaze between three different locations on the screen. It is noteworthy that some buttons such as space and move left may be deleted in the above scenario.

Figure 20:
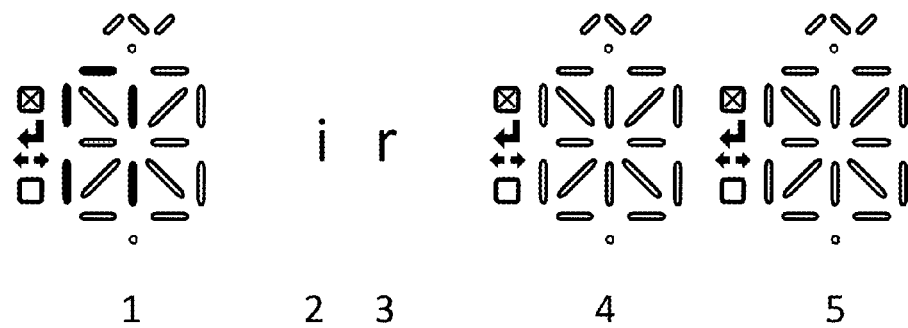
FIG. 20 depicts predicted matched characters written on the screen while receiving an input for a new character.

In one embodiment, instead of displaying the predicted characters on segmented patterns, they are written on the screen. Touching one of the characters will replace the character with a pattern on which the user can write a new character (FIG. 20). In one embodiment, a piece of plastic/metal/etc. is put on the touch screen or touch pad to limit the movement of finger or stylus to make it easy for the user to enter characters possibly without looking at the pattern.

In one embodiment, after a character is recognized, it is pronounced. In one embodiment, after a character is recognized, a beep is played. This is an indicator of successfully detecting the input. Specifically it is an indicator that the input signal is providing a matched character determined by the electronic device according to the input and the corresponding character table.

In one embodiment, the table which maps segment numbers into characters (associating a set of numeric values to each character to provide a corresponding character table stored in the electronic device) can be edited by the user. In one embodiment, the corresponding character table can be automatically modified by the system/method/device based on the user's behavior (e.g., there are two entries for character "A" in the table, one entry corresponds to writing the character at left and a second entry corresponds to writing the character at right. If the user writes character "A" always on the left side of the pattern, the system/method/device can delete the second entry. This can reduce the error rate if the system/method/device tries to guess the intended character in presence of user error).

In one embodiment, the size of the segmented pattern and/or the distance of segments can be changed by the user. In one embodiment, the size of the segmented pattern and/or the distance of segments can be changed by the system/method/device based on the user's behavior, the errors occurred while entering characters and the error rate.

In one embodiment, the size of the sensitive part of the segments can be changed by the user. In one embodiment, the size of the sensitive part of the segments can be changed by the system/method/device based on the user's behavior, the errors occurred while entering characters and the error rate.

In one embodiment, the orientation/angle of the segmented pattern can be changed by the user. In one embodiment, the orientation/angle of the segmented pattern can be changed by the system/method/device based on the user's behavior, the errors occurred while entering characters and the error rate. In one embodiment, some segments are selected only if they are touched in particular directions. In one embodiment, some segments are selected only by tapping on them. In one embodiment, some segments cannot be selected by tapping on them. In some embodiments, the at least one segment is accepted as an input signal received on at least one segment of the segmented pattern only when input in a particular direction. For example, the segment may be pressed, tapped or touched in a direction left to right on the segment for it to be accepted as an input signal. If the segment is pressed, tapped or touched in any other direction (for example, right to left) it would not be accepted as an input signal and would be ignored. This can reduce the error rate. For example if the pattern of FIG. 6a is small, when touching one of the top horizontal segments the top circle may be touched and selected accidentally. The error is prevented if the top circle can be selected by tapping only.

In one embodiment, a segmented pattern is used to enter geometric shapes (FIG. 21a). FIG. 21a depicts a segmented pattern further comprising a circle and having the segments inside it. There may be an additional shape forming a triangular portion on the right side. FIG. 21b shows how a circle can be drawn by the user. In response to drawing a circle on the segmented pattern, the system/method/device draws a circle on a special area on the screen. The user can drag and move the shape (in this case the circle) to the desired location. In one embodiment, if the user does not move the shape and enters another shape and the direction of the finger movement (an input signal) is the same when drawing both shapes, based on the first and the second shapes, a 3-D shape is created and replaces the first shape. The top view of the 3-D shape is the first drawn shape and the front view of the 3-D shape is the second drawn shape (FIG. 22a and FIG. 22b). The character table may be extended by adding at least one shape definition and a matched shape. The matched shape may be selected from the group consisting of two dimensional shapes, three dimensional shapes and composite shapes. A composite shape (200) is a shape made up of more than one shape.

In one embodiment, if the user creates a shape and does not move the shape, and continues with drawing a second shape and the direction of the finger movement is different when drawing two shapes, a third shape (a composite shape) is created based on the first and the second shape, where the exterior of the third shape is the first shape, while the interior of the third shape is the second shape. The third shape replaces the first drawn shape (FIG. 23a and FIG. 23b). In one embodiment, if at the beginning of drawing the shape on the segmented pattern, the user taps one or more time on the first segment before he draws the rest of the shape, instead of solid lines, dots are used to generate the shape, that can be moved around the screen by the user.

In one embodiment, if at the beginning of drawing the shape on the segmented pattern, the user uses short strokes one or more time before he draws the rest of the shape, instead of solid lines, dashes are used to generate the shape, that can be moved around the screen by the user.

In one embodiment, if after drawing the shape on the pattern, the user taps one or more time on the created shape, dots are used to redraw the generated shape, that can be moved around the screen by the user.

Figure 24:
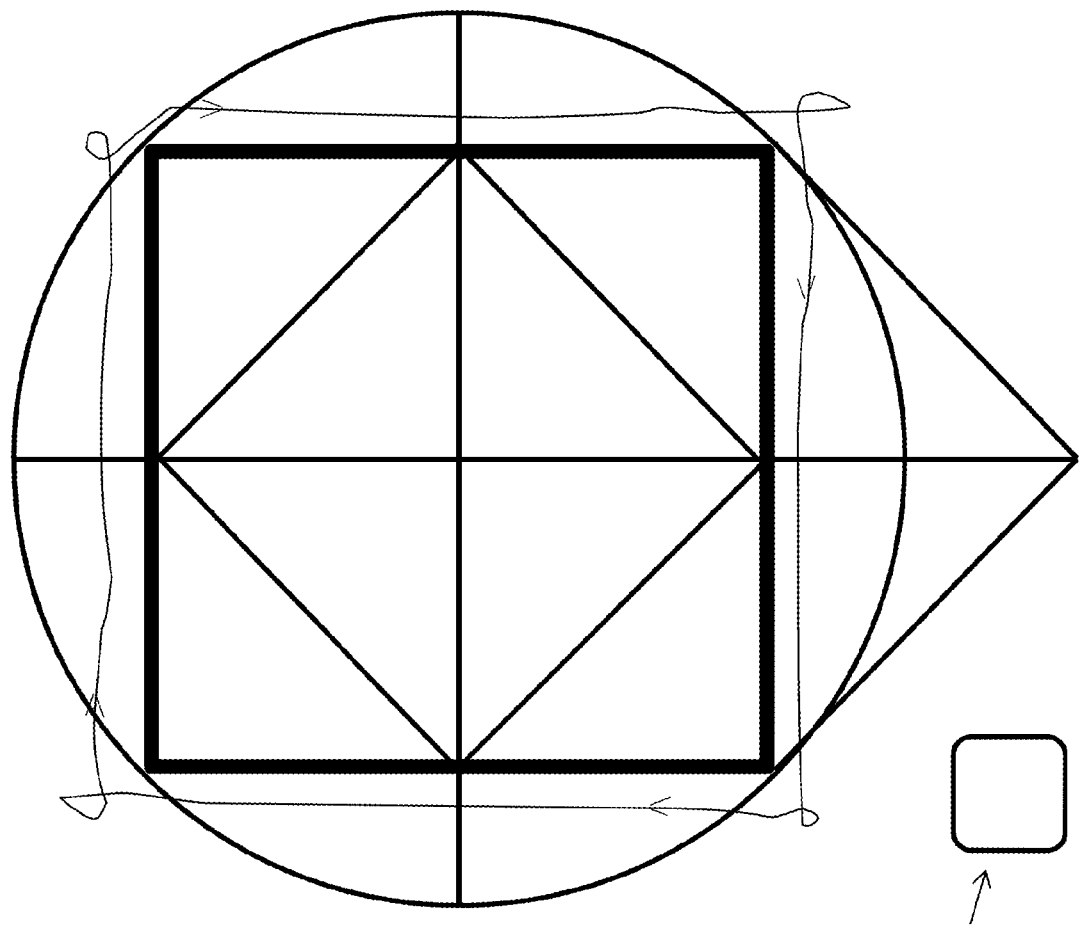
FIG. 24 depicts a segmented pattern which has been used for inputting a square with round corners according to the present invention.

In one embodiment, if after drawing the shape on the pattern, the user draws dashes one or more time on the created shape, dashes are used to redraw the generated shape, that can be moved around the screen by the user. In one embodiment, if the finger/stylus does a circular movement when drawing a shape on the pattern, the corners of the generated shape will be round (FIG. 24).

Figure 25:
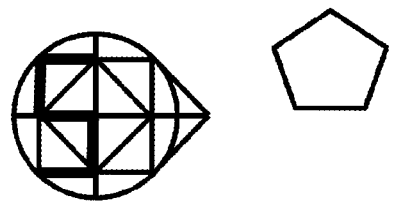
FIG. 25 depicts a segmented pattern which has been used for inputting a pentagon according to the present invention.

In one embodiment, writing a number on the segmented pattern, results in generating a regular polygon with that number of sides. For example, in response to writing number 5 on the segmented pattern, a pentagon is generated (FIG. 25).

Figure 26A:
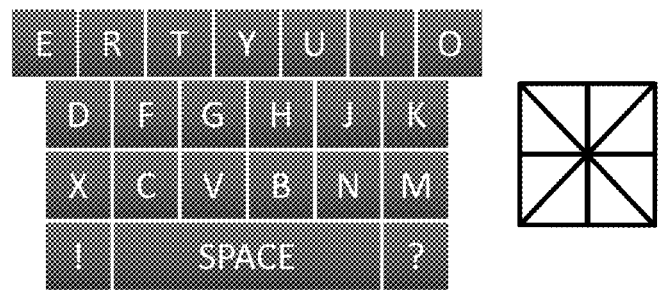
FIG. 26a depicts a segmented pattern, used with a keyboard (partially shown), to enter characters not supported by the keyboard.
Figure 26B:
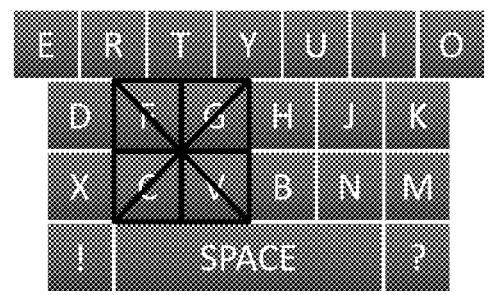
FIG. 26b depicts a segmented pattern displayed between the keys of a virtual keyboard (the keyboard is partially shown)
Figure 26C:
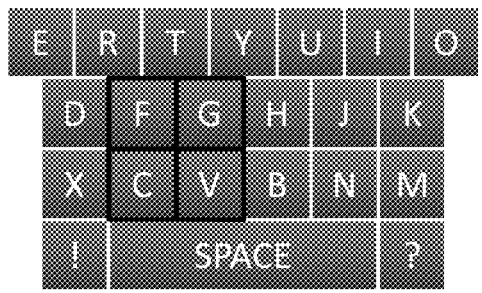
FIG. 26c depicts a segmented pattern displayed between keys of a virtual keyboard (the keyboard is partially shown)
Figure 26D:
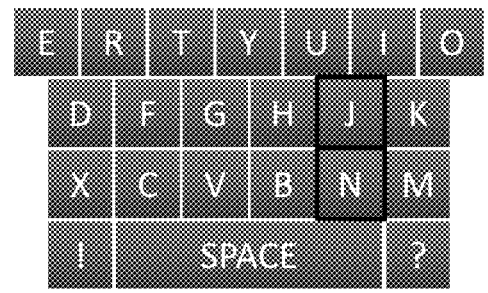
FIG. 26d depicts a segmented pattern displayed between keys of a virtual keyboard (the keyboard is partially shown)

In one embodiment, the segmented pattern is used in conjunction with a physical or virtual keyboard. The segmented pattern may be used to enter characters not supported by the keyboard or to enter characters in a different language, while the keyboard can be used to quickly enter limited characters supported by the keyboard (FIG. 26a). In one embodiment, the segmented pattern is displayed on a virtual keyboard. This reduces the total footprint of the keyboard and the segmented pattern. In one embodiment, the segmented pattern is displayed between keys of a virtual keyboard (FIG. 26b, 26c, 26d).

In one embodiment, there are buttons which can be used to change the language supported by the segmented pattern. In one embodiment, there are buttons which can be used to change the segmented pattern itself (e.g., displaying a pattern with a different number of segments).

In one embodiment, pinyin is used to enter Chinese characters. In one embodiment, hiragana is used to enter Japanese Kanji characters. In one embodiment, there is more than one segmented pattern and depending on which segmented pattern the characters are written the conversion to Kanji may or may not be performed. Thus, it will not be necessary to press an additional key to switch between modes or to tell the system/method/device to do the conversion.

In one embodiment, the strokes and selected segments are recorded so the user can look at them later to verify the accuracy of data entry and conversion. In some languages, characters are usually written in a particular direction (e.g., from left to right). In one embodiment, the system/method/device uses the direction of writing a character to detect the language. In one embodiment, the system/method/device uses the direction of writing a character to detect the character (i.e., if the set of touched segments correspond to valid characters in more than one language, the direction of writing the character is used to detect the language and resolve the ambiguity about the intended character). The direction of the input signal received on at least one segment of the segmented pattern may be determined according to the input having numeric values associated with each of the segments. For example, with reference to FIG. 2, if the user touches the segments (8, 9 and 10) in that order on the touch screen, we know the user's finger is moving left to right. In contrast, if the user touches the segments (10, 9 and 8) in that order, we know the user's finger is moving right to left. In one embodiment, the system/method/device uses the previous written character or characters to detect the language and resolve the ambiguity if the set of touched segments correspond to multiple characters in multiple languages.

In one embodiment, based on the multiple characters or strokes written by the user, the information about valid words in different languages, and grammatical rules, the system/method/device detects the language and characters. This provides an easy way for the user to switch between languages. In one embodiment, the system/method/device is used alongside a keyboard and based on the multiple characters or strokes written by the user, keys pressed on the keyboard (keyboard character input), the information about valid words in different languages, and grammatical rules, the system/method/device detects the language and characters. This provides an easy way for the user to switch between languages. A system/method/device which has a keyboard and based on the keys pressed, the information about valid words in different languages, and grammatical rules, the system/method/device detects the language and characters entered by the user. This provides an easy way for the user to switch between languages.

Figure 27:
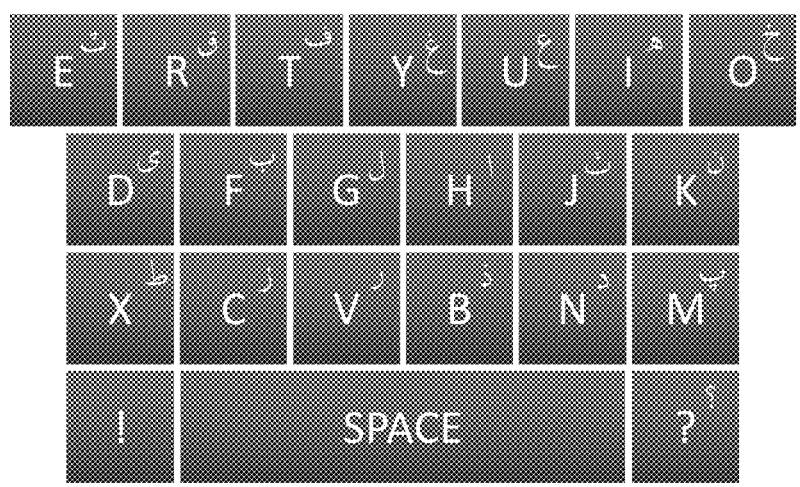
FIG. 27 depicts a multi-lingual keyboard (partially shown)

A system/method/device with a multi-lingual keyboard, which characters of two or more languages are displayed on the keyboard keys. The system/method/device uses a sequence of keys pressed by the user (the keyboard accepts keyboard character input), searches dictionaries of two or more languages and uses the grammatical rules of two or more languages to find out a valid word corresponding to the sequence of keys pressed (the keyboard character input) and uses that to detect the language in which the user is typing. This provides an easy way for the user to switch between languages. FIG. 27 shows a part of a multi-lingual keyboard, which supports English and Farsi languages. As an example, if the user presses the keys corresponding to "N" and "O", the user meant to type either word "No" in English or "نو" in Farsi. Since the word "نو" does not exist in Farsi, therefore, the user must have been typing in English and the user meant to type "No". In this way, the system may use the dictionaries to detect the language in which the user is writing, providing a matched language. The matched language and the matched character are determined by the electronic device according to the keyboard, character input converted into numeric values, input having numeric values and the character table. The matched character in the matched language is displayed on the touch sensitive graphical user interface of an electronic device and stored in the electronic device and the segmented pattern on the touch sensitive graphical user interface of the electronic device is reset. The keyboard character input may or may not be converted into numeric values.

In one embodiment, the character table is searched to find if the set of touched segments is valid (i.e., corresponds to a character).

In one embodiment, if there is no character corresponding with the touched segments, the system/method/device searches the table, which has the mapping of set of touched segments to characters, and finds the character whose set of touched segments, C, is close to the set of touched segments by the user (set U). In one embodiment, the character is chosen such that the intersection of U with C has the maximum number of segments. In one embodiment, the character is chosen such that (C-U) union with (U-C) has the minimum number of segments. In one embodiment, the character is chosen, such that it minimizes a function F(C, U). In one embodiment, F(C, U) is a weighted sum of the segments of U, C, the intersection of U and C, U-C, and C-U.

In one embodiment, the system/method/device is integrated with a controller to allow inputting characters/symbols easily. In one embodiment, the controller is a remote controller. In one embodiment, the controller is a remote controller of a TV. In one embodiment, the controller is a remote controller of a TV set top box. In one embodiment, the controller is a remote controller of an internet TV or a smart TV.

In one embodiment, the system/method/device is integrated with a device to allow entering characters/symbols into a tablet, cell phone, or laptop. In one embodiment, the device communicates with the tablet, cell phone, or laptop wirelessly. In one embodiment, the device is used to access social networking sites.

In one embodiment, the system/method/device is integrated within a watch. In one embodiment, the system/method/device is integrated within a portable music player.

In one embodiment, the system/method/device is integrated with the touch pad of a laptop. In one embodiment, the system/method/device is integrated with an external touch pad of a computer (e.g., a peripheral).

In one embodiment, the system/method/device is used for entering numbers only. In one embodiment, the system/method/device has a 7-segment pattern and is used for entering numbers only. In one embodiment, the system/method/device is used for entering numbers and punctuations only. In one embodiment, the system/method/device is used for entering numbers and arithmetic operations.

In one embodiment, the system/method/device is integrated with a physical or a virtual keyboard. In one embodiment, the system/method/device is integrated with a virtual keyboard and the pattern is displayed on the virtual keyboard. In one embodiment, the system/method/device is integrated with a virtual keyboard and a 7-segment pattern is displayed between the keys of the virtual keyboard. The pattern is used for entering numbers and punctuations.

There may be a system for inputting data in an electronic device utilizing both a keyboard and a segmented pattern, the system having a segmented pattern on a touch sensitive graphical user interface of an electronic device, the segmented pattern having at least two segments; a numeric value in the electronic device associated to each of the at least two segments; a set of the numeric values associated to at least one character to provide a corresponding character table stored in the electronic device; an input signal received on at least one segment of the segmented pattern to provide an input having numeric values associated with each of the segments; a matched character determined by the electronic device according to the input having numeric values and the character table; a keyboard in communication with the touch sensitive graphical user interface of the electronic device, wherein the keyboard accepts keyboard character input; wherein the matched character and the keyboard character input is displayed on the touch sensitive graphical user interface of an electronic device and stored in the electronic device and the segmented pattern on the touch sensitive graphical user interface of the electronic device is reset. The input signal may be ended in response to any keyboard character input. The keyboard may be a virtual keyboard (See, for example, FIG. 26a) and may have the segmented pattern displayed on the virtual keyboard (See, for example, FIG. 26b). The keys are sensitive to pressing by a finger or stylus.

The segments of the segmented pattern can be selected by dragging a finger/stylus on the touch screen. The character table may be extended by adding at least one shape definition and a matched shape. There may also be a separate and distinct shape table. For example, the character table may be extended to include a shape definition that an input having numeric values of (7, 16, 14 and 6) corresponds to a square. There may also be a separate shape table having the same shape definition (an input having numeric values of (7, 16, 14 and 6) corresponds to a square). The matched shapes may be, without limitation, two dimensional shapes, three dimensional shapes and composite shapes (200).

There may be a system for inputting data in an electronic device utilizing both a keyboard and a segmented pattern, the system having a segmented pattern on a touch sensitive graphical user interface of an electronic device, the segmented pattern having at least two segments; a numeric value in the electronic device associated to each of the at least two segments; a set of the numeric values associated to at least one character to provide a corresponding character table stored in the electronic device; an input signal received on at least one segment of the segmented pattern to provide an input having numeric values associated with each of the segments; a matched character determined by the electronic device according to the input having numeric values and the character table; a keyboard in communication with the touch sensitive graphical user interface of the electronic device, wherein the keyboard accepts keyboard character input; wherein the matched character and the keyboard character input is displayed on the touch sensitive graphical user interface of an electronic device and stored in the electronic device and the segmented pattern on the touch sensitive graphical user interface of the electronic device is reset. The input signal may be ended in response to any keyboard character input. The keyboard may be a virtual keyboard (See, for example, FIG. 26a) and may have the segmented pattern displayed on the virtual keyboard (See, for example, FIG. 26b). The keys are sensitive to pressing by a finger or stylus.

The segments of the segmented pattern can be selected by dragging a finger/stylus on the touch screen. The character table may be extended by adding at least one shape definition and a matched shape. There may also be a separate and distinct shape table. For example, the character table may be extended to include a shape definition that an input having numeric values of (7, 16, 14 and 6) corresponds to a square. There may also be a separate shape table having the same shape definition (an input having numeric values of (7, 16, 14 and 6) corresponds to a square). The matched shapes may be, without limitation, two dimensional shapes, three dimensional shapes and composite shapes (200).

Also provided is a system for inputting data in an electronic device, the system comprising: a segmented pattern on a touch sensitive graphical user interface of an electronic device, the segmented pattern having at least two segments and restricting input signals according to a set of predetermined rules; an input signal received on at least a portion of a segment to provide an input having the coordinates of touched points; a matched character determined by the electronic device according to input having the coordinates of touched points and at least one algorithm; wherein the matched character is displayed on the touch sensitive graphical user interface of an electronic device and stored in the electronic device and the segmented pattern on the touch sensitive graphical user interface of the electronic device is reset.

Figure 30:
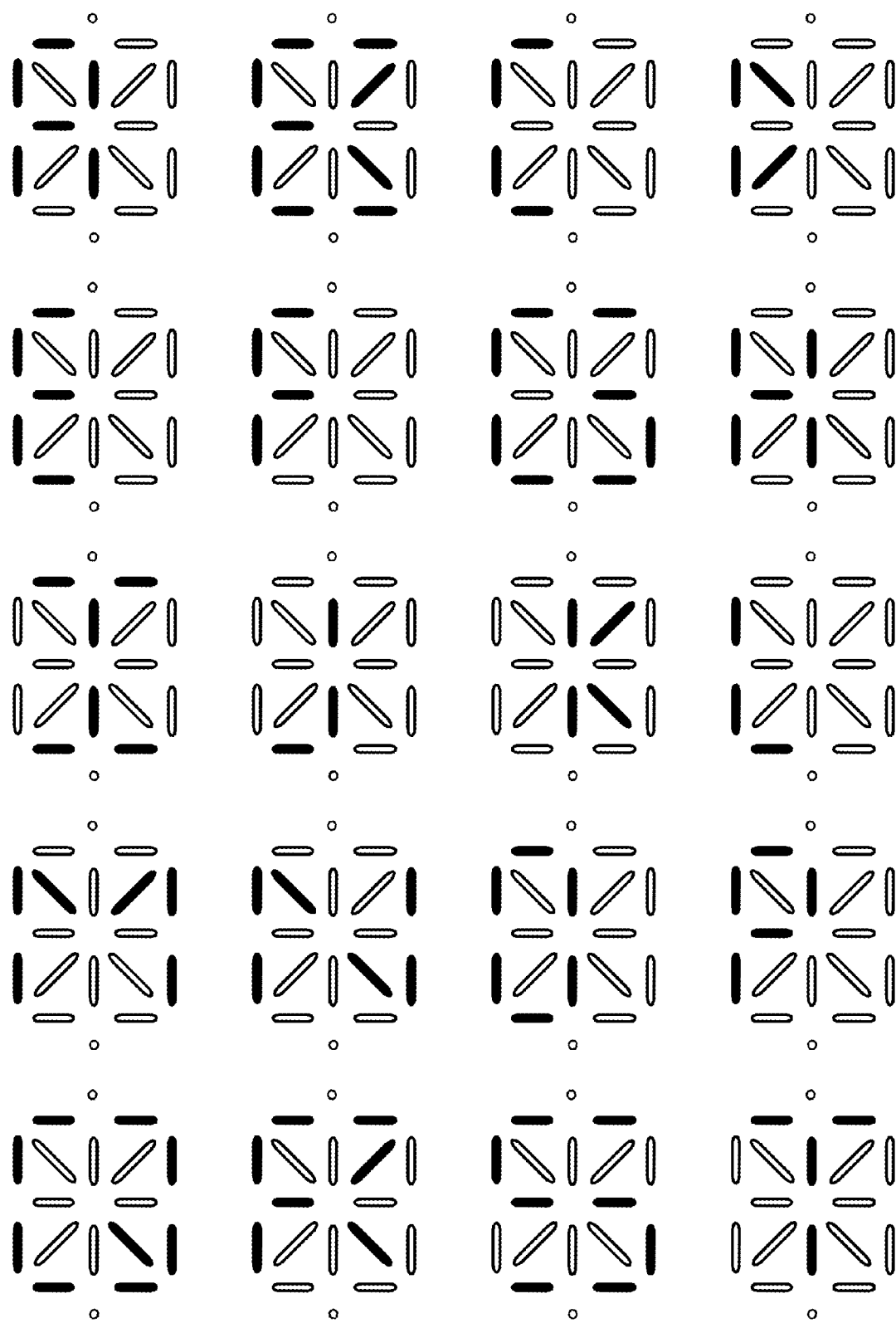
FIG. 30 depicts examples of uppercase and lowercase English characters, numbers and symbols written on the segmented pattern.
Figure 31:
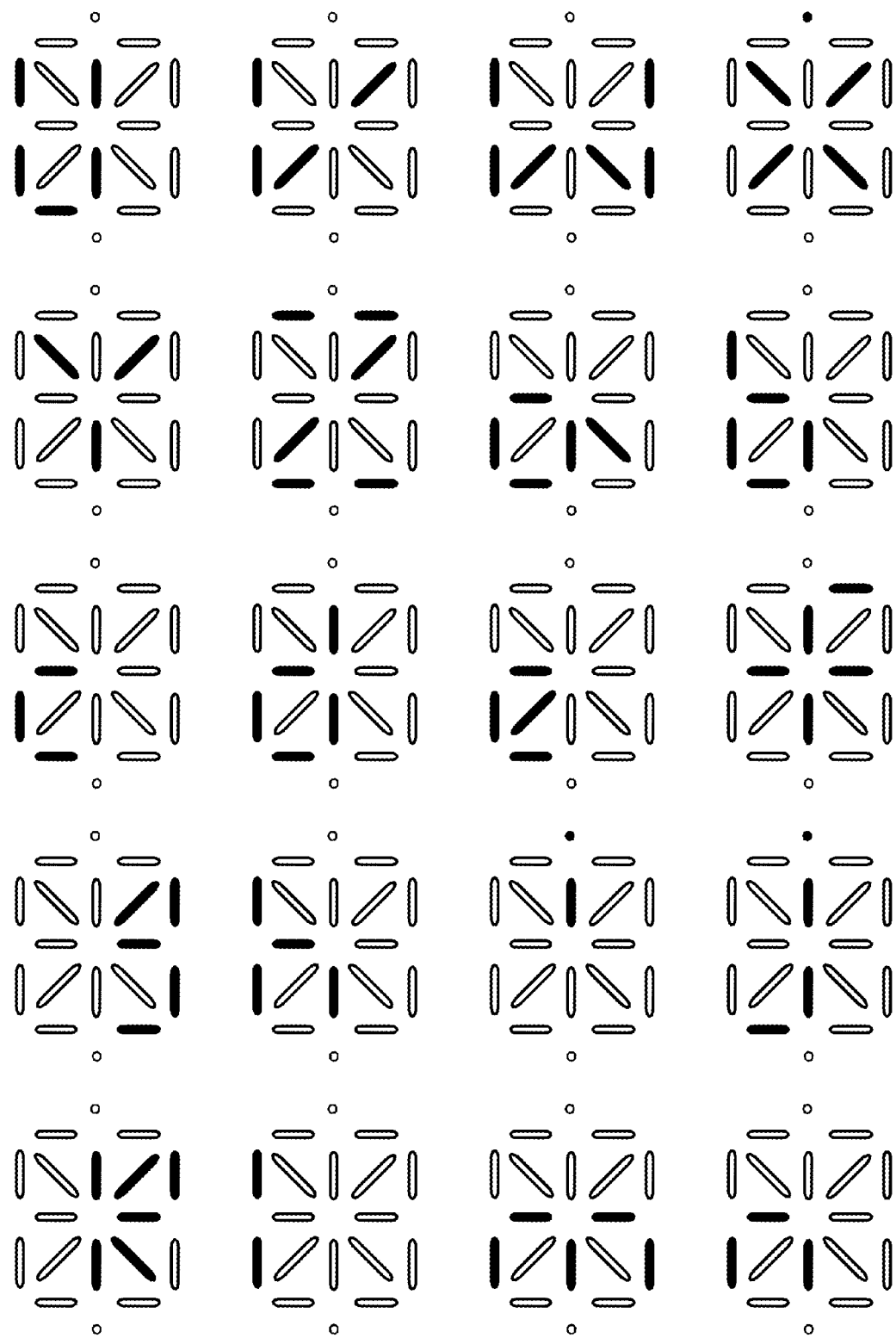
FIG. 31 depicts examples of uppercase and lowercase English characters, numbers and symbols written on the segmented pattern.
Figure 32:
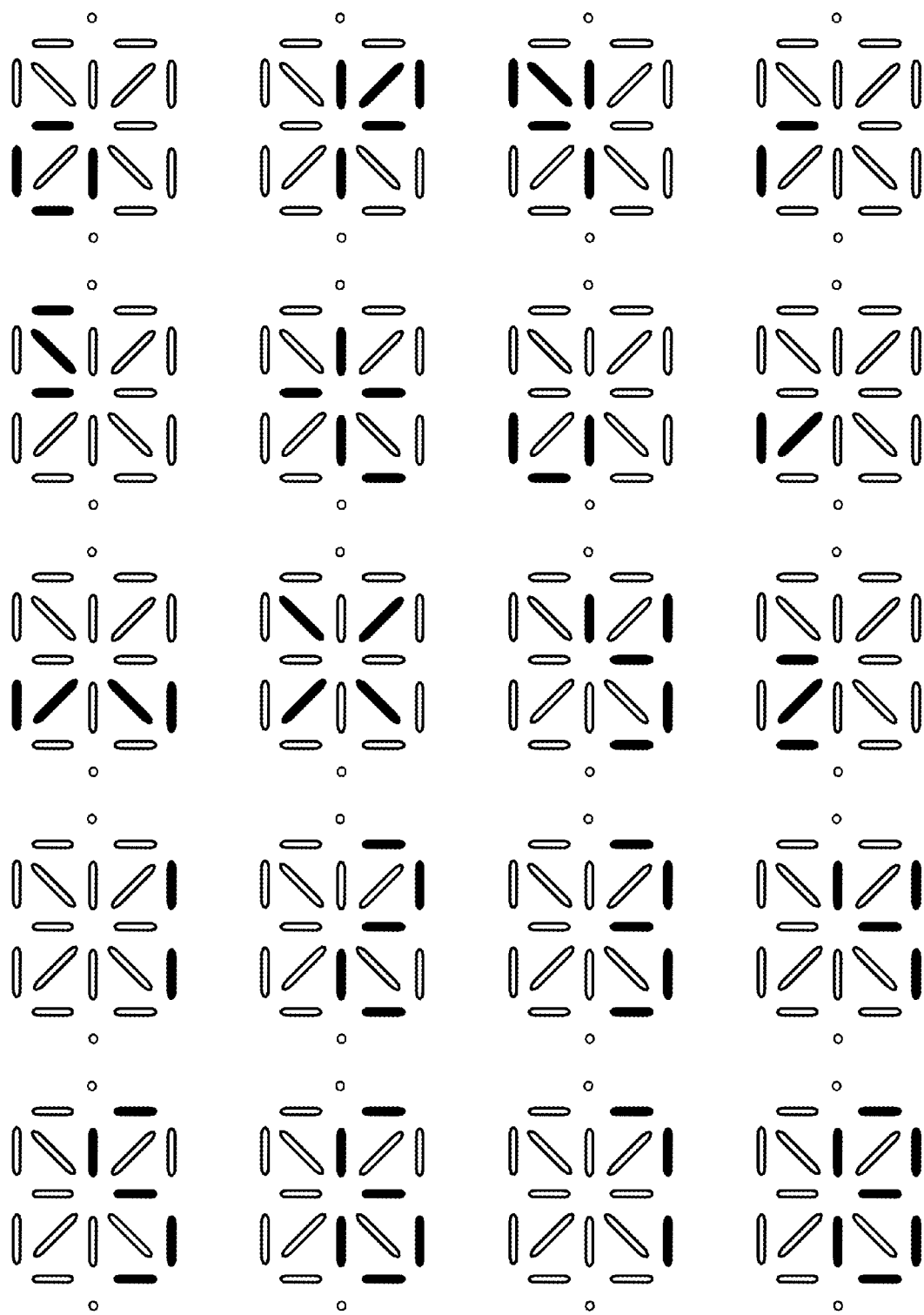
FIG. 32 depicts examples of uppercase and lowercase English characters, numbers and symbols written on the segmented pattern.
Figure 33:
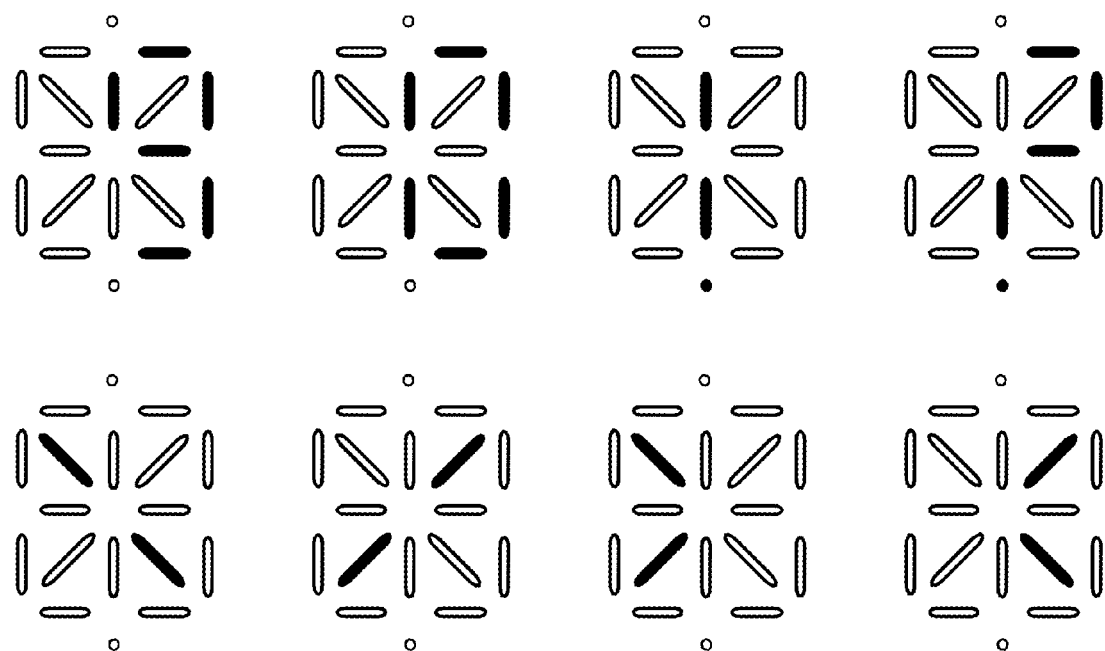
FIG. 33 depicts examples of uppercase and lowercase English characters, numbers and symbols written on the segmented pattern.

In this embodiment, a segmented pattern is used to restrict the way a user will write characters according to a set of predetermined rules (e.g., the user will be limited to write characters and symbols as illustrated in FIG. 30). The system/device/method will use one of the many character recognition algorithms to detect the written character. This will reduce the error rate of the character recognition algorithm.

In one embodiment, at least one algorithm is a neural network based algorithm used to detect the written characters. A neural network is first trained using an initial set of hand written characters on the segmented pattern. For example, one or more persons will write character "A" 100 times, in each case trying to write it as illustrated in FIG. 1c. The neural network is trained using these 100 samples and other samples which do not correspond to character "A". After that the neural network is used to detect character "A". In addition to the shape of the characters, the segmented pattern restricts their sizes and rotations, both of which simplify the preprocessing steps typically used in neural based algorithms.

In one embodiment, a feature extraction based algorithm is used to detect a written character. In these algorithms, important features of the image of the character such as the aspect ratio, the average distance of pixels from the center of the image, the x-axis symmetry, the y-axis symmetry, the percentage of pixels on each side of the horizontal or vertical half point are calculated and used to detect the written character. In addition to the shape of the characters, the segmented pattern restricts their sizes and rotations, both of which simplify the preprocessing steps which maybe use in feature extraction based algorithms.

In a neural network, each neuron calculates the following function, $$Sum = X_1*W_1 + x_2*W_2 + X_n*W_n$$

where $X_1, \ldots, X_n$ are the inputs and $W_1, \ldots, W_n$ are the weights. If Sum is greater than or equal to a threshold value, th, the output will be 1. Otherwise, it will be 0.

For each character, there is a neuron, whose weights are calculated such that the output of the neuron is 1 if the input values correspond to the character. Otherwise, the output is 0.

Inputs $X_1, \ldots, X_n$ correspond to the pixels of the touch screen where the segmented pattern is displayed. Xi is 1 if its corresponding pixel has been touched when writing the character on the screen. Otherwise, it is 0.

For each character, a training set, containing training vectors, is constructed. Each training vector <X1, X2, ..., Xn, y_e> is constructed by writing the specific character and other characters on the segmented pattern multiple times (y_e is the correct or expected output value of the neuron. y_e is 1 if the vector corresponds to the specific character; otherwise, it is 0).

Next, the training set of each character is used to train its corresponding neuron to detect the character.

Training Algorithm:

Set all weights and threshold values to small random numbers.

```
done = false;
while (!done) {
    done = true;
    for each training vector of the training set {
        Calculate Sum = X1*W1 + X2*W2 + ... + Xn*Wn
        If Sum >= th
            y = 1;
        else y = 0;
        If y != y_e {
            done = false;
            for 0 <= i <= n {
                Update the value of Wi according to an algorithm; // E.g.,
                Wi = Wi + alpha * (y_e - y) * Xi, where 0 < alpha <1.
            }
        }
    }
}
```

After calculating the weights of all neurons, the neurons can be used to recognize the character. In other words, the values of $X_1, \ldots, X_n$ corresponding to a character written by the user can be used to calculate the output of the neurons and detect the character.

The above describes a basic algorithm. It is possible to change it in many ways. For example, the way the weights are updated can be changed. It is also possible to use a multilayer network, in which the outputs of neurons of one layer are the inputs of the neurons of the next layer (except the outputs of the neurons of the last layer, which are the outputs of the neural network). It is also possible to have feedback from the neurons of one layer to the neurons of one of its preceding layers (i.e., the outputs of the neurons of one layer may be used as some inputs to the neurons of a preceding layer).

According to another aspect of the present invention, a method for inputting data in an electronic device is provided, the method comprising: presenting a segmented pattern on a touch sensitive graphical user interface of an electronic device, the segmented pattern having at least two segments; associating a numeric value in the electronic device to each of the at least two segments; associating a set of the numeric values to at least one character to provide a corresponding character table stored in the electronic device; receiving an input signal on at least one segment of the segmented pattern to provide an input having numeric values associated with each of the segments; determining a sequence of at least one segment according to the input having numeric values and the character table; determining a matched character according to the input having numeric values, the sequence and the corresponding character table; displaying the matched character on the touch sensitive graphical user interface of an electronic device; storing the matched character in the electronic device; and resetting the segmented pattern on the touch sensitive graphical user interface of the electronic device. The method may further comprise the steps of: backtracking and changing the sequence chosen from input signals received on at least one segment based on the results of matched characters or unmatched characters determined by the electronic device according to the input having numeric values and the character table. According to another aspect of the present invention, the method may further comprise the steps of analyzing the result of the matched characters using a dictionary; and backtracking to change the sequence chosen from input signals. According to another aspect of the present invention, the method may further comprise the steps of determining the direction of the input signal received on at least one segment of the segmented pattern according to the input having numeric values associated with each of the segments; and detecting the language and character the user is writing according to the input having numeric values and the character table. According to another aspect of the present invention, the method may further comprise the steps of detecting the language the user is writing in according to at least two dictionaries of at least two languages. According to another aspect of the present invention, the method may further comprise the steps of determining whether there is an absence of a matched character; providing a matched character, in the absence of a matched character, according to the input having numeric values, the sequence and the closest character in the character table. According to another aspect of the present invention, the sequence of the input signals received on at least two segments is the shortest possible sequence; the sequence of the input signals received on at least two segments ends at the point an input signal is not being received on the segmented pattern of the touch sensitive graphical user interface a point the user had lifted his finger/stylus; the sequence ends at the point an input signal is not being received on the segmented pattern of the touch sensitive graphical user interface unless the sequence of the inputs received on at least one segment is in an exception list; at least one segment is accepted as an input signal received on at least one segment of the segmented pattern in a particular direction; the input signal is selected from the group consisting of touch contact, stylus device contact and video input. An input signal received on at least one segment of the segmented pattern is converted to strokes, a sequence of strokes are selected, and the sequence of segments are built from the sequence of strokes. According to another aspect of the present invention, the method may further comprise the steps of backtracking, by the electronic device, and changing the sequence of strokes selected based on the results of the matched characters or unmatched characters. According to another aspect of the present invention, the method may further comprise the steps of comprising the step of accepting keyboard character input in a keyboard in communication with a touch sensitive graphical user interface of the electronic device. The character table is extended by adding at least one shape definition and a matched shape is selected from the group consisting of two dimensional shapes, three dimensional shapes and composite shapes. According to another aspect of the present invention, the method may further comprise the steps of accepting keyboard character input in a virtual keyboard in communication with a touch sensitive graphical user interface of the electronic device; providing a segmented pattern on the virtual keyboard, the segmented pattern having at least two segments; associating a numeric value in the electronic device to each of the at least two segments; associating a set of the numeric values to at least one character to provide a corresponding character table stored in the electronic device; receiving an input signal on at least one segment of the segmented pattern to provide an input having numeric values associated with each of the segments; and determining a matched character by the electronic device according to the input having numeric values and the character table; displaying the matched character and the keyboard character input on the touch sensitive graphical user interface of an electronic device; storing the matched character and the keyboard character input in the electronic device; and resetting the segmented pattern on the touch sensitive graphical user interface of the electronic device. According to another aspect of the present invention, the method may further comprise the step of accepting any keyboard character input on the keyboard denotes the end of the input signal. According to another aspect of the present invention, the method may further comprise the steps of: selecting segments of the segmented pattern by dragging a finger/stylus on the touch screen and the keys are sensitive to pressing the finger/stylus. According to another aspect of the present invention, the method may further comprise the steps of: providing a multi-lingual keyboard with multiple characters written on each key in communication with the electronic device, wherein said keyboard accepts keyboard character input; and providing at least two dictionaries, wherein each dictionary contains words of a given language; detecting the matched language in which the user is typing based on the keyboard character input. The keyboard character input is converted into numeric values to provide keyboard character input converted into numeric values. According to another aspect of the present invention, the method may further comprise the steps of: providing a segmented pattern on a touch sensitive graphical user interface of an electronic device, the segmented pattern having at least two segments; providing a numeric value in the electronic device associated to each of the at least two segments; associating a set of the numeric values to at least one character to provide a corresponding character table stored in the electronic device; receiving an input signal received on at least one segment of the segmented pattern to provide an input having numeric values associated with each of the segments; determining a matched language and a matched character by the electronic device according to the keyboard, character input converted into numeric values, input having numeric values and the character table; wherein the matched character in the matched language is displayed on the touch sensitive graphical user interface of an electronic device and stored in the electronic device and the segmented pattern on the touch sensitive graphical user interface of the electronic device is reset. According to another aspect of the present invention, the method may further comprise the steps of providing a segmented pattern on a touch sensitive graphical user interface of an electronic device, the segmented pattern having at least two segments; associating a numeric value in the electronic device associated to each of the at least two segments; associating a set of the numeric values associated to at least one shape to provide a corresponding shape table stored in the electronic device; receiving an input signal received on at least one segment of the segmented pattern to provide an input having numeric values associated with each of the segments; determining a matched shape determined by the electronic device according to input having numeric values and the shape table; wherein the matched shape is displayed on the touch sensitive graphical user interface of an electronic device and stored in the electronic device and the segmented pattern on the touch sensitive graphical user interface of the electronic device is reset. The matched shape is selected from the group consisting of a two dimensional shape, a three dimensional shape and composite shapes. According to another aspect of the present invention, the method may comprise the steps of: providing at least two segmented patterns on a touch sensitive graphical user interface of an electronic device, each segmented pattern having at least two segments; providing a numeric value in the electronic device associated to each of the at least two segments; associating a set of the numeric values associated to at least one character to provide a corresponding character table stored in the electronic device; receiving an input signal on at least one segment of the segmented pattern to provide an input having numeric values associated with each of the segments; determining a matched character by the electronic device according to the input and the corresponding character table; wherein an indicator of the input signal is displayed on segments of a second segmented pattern according to the input signal received on at least one segment of a first segmented pattern and the matched character is displayed on the touch sensitive graphical user interface of the electronic device and stored in the electronic device and the first and second segmented patterns are reset. According to another aspect of the present invention, the method may comprise the steps of displaying at least two segmented patterns on a touch sensitive graphical user interface of an electronic device, each segmented pattern having at least two segments; associating a numeric value in the electronic device associated to each of the at least two segments; associating a set of the numeric values associated to at least one character to provide a corresponding character table stored in the electronic device; receiving an input signal received on at least one segment of the segmented pattern to provide an input having numeric values associated with each of the segments; determining a matched character by the electronic device according to the input having numeric values and the corresponding character table; wherein the matched character is displayed in place of the segmented pattern displayed on a touch sensitive graphical user interface of an electronic device on which the input signal was received, stored in the electronic device and the segmented pattern on the touch sensitive graphical user interface of the electronic device is reset. According to another aspect of the present invention, the method may further comprise the steps of providing a dictionary, wherein a predicted character the user is going to write is predicted according to the dictionary, previously written words by the user, the input having numeric values, and the corresponding character table and the predicted character is displayed on the segmented pattern. A user can select at least one predicted character, by continuing to input an input signal on a segmented pattern displayed on a touch sensitive graphical user interface of an electronic device after the predicted character is displayed. According to another aspect of the present invention, the method may comprise the steps of providing a segmented pattern on a touch sensitive graphical user interface of an electronic device, the segmented pattern having at least two segments and restricting input signals according to a set of predetermined rules; receiving an input signal received on at least a portion of a segment to provide an input having the coordinates of touched points; determining a matched character by the electronic device according to input having the coordinates of touched points and an algorithm; wherein the matched character is displayed on the touch sensitive graphical user interface of an electronic device and stored in the electronic device and the segmented pattern on the touch sensitive graphical user interface of the electronic device is reset. The algorithm is a neural network based algorithm.

It should be understood that the foregoing relates to preferred embodiments of the invention and that modifications may be made without departing from the spirit and scope of the invention as set forth in the following claims.

I claim:

1. A system for inputting data in an electronic device, the system comprising:
   at least two segmented patterns on a touch sensitive graphical user interface of an electronic device, each segmented pattern having at least two segments;
   a numeric value in the electronic device associated to each of the at least two segments;
   a set of the numeric values associated to at least one character to provide a corresponding character table stored in the electronic device;
   one or more input signals received on at least one segment of the segmented patterns to provide an input having numeric values associated with each of the segments;
   a matched character determined by the electronic device according to the input and the corresponding character table;
   wherein an indicator of the one or more input signals is displayed on segments of a second segmented pattern according to the one or more input signals received on at least one segment of a first segmented pattern and the matched character is displayed on the touch sensitive graphical user interface of the electronic device and stored in the electronic device and the first and second segmented patterns are reset.

2. A system for inputting data in an electronic device, the system comprising:
   at least three segmented patterns displayed on a touch sensitive graphical user interface of an electronic device, each segmented pattern having at least two segments;
   a distinct numeric value in the electronic device associated to each of the at least two segments;
   a set of the numeric values associated to at least one character to provide a corresponding character table stored in the electronic device;
   one or more input signals received on at least one segment of a first of the at least three segmented patterns to provide an input having numeric values associated with at least one of the segments, wherein a predicted character is displayed on a second of the at least three segmented patterns according to at least one of the one or more input signals received on at least one of the segments of the first of the at least three segmented patterns, the input having numeric values and the corresponding character table;
   wherein the predicted character is accepted as a matched character when the one or more input signals continues to be received on a segmented pattern located after the predicted character is displayed.

3. A system as in claim 2, further comprising a dictionary, wherein the predicted character the user is going to write is predicted according to at least one of the dictionary, previously written words by the user, the input having numeric values, and the corresponding character table.

4. A system as in claim 3, wherein a user can select at least one predicted character, by continuing to input one or more input signals on a segmented pattern displayed on a touch sensitive graphical user interface of an electronic device after the predicted character is displayed.

* * * * *